United States Patent
Mittal et al.

(10) Patent No.: US 11,349,715 B2
(45) Date of Patent: May 31, 2022

(54) METHOD AND SYSTEM FOR CONSISTENT POLICY ENFORCEMENT THROUGH FABRIC OFFLOADING

(71) Applicant: Arista Networks, Inc., Santa Clara, CA (US)

(72) Inventors: Anuraag Mittal, Santa Clara, CA (US); Theiesh Panchappa, Santa Clara, CA (US); Arup Raton Roy, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 217 days.

(21) Appl. No.: 16/391,517

(22) Filed: Apr. 23, 2019

(65) Prior Publication Data

US 2020/0252291 A1  Aug. 6, 2020

Related U.S. Application Data

(60) Provisional application No. 62/800,225, filed on Feb. 1, 2019.

(51) Int. Cl.
| | |
|---|---|
| *H04L 41/0893* | (2022.01) |
| *H04L 47/20* | (2022.01) |
| *H04L 47/80* | (2022.01) |
| *H04L 41/50* | (2022.01) |

(52) U.S. Cl.
CPC ...... *H04L 41/0893* (2013.01); *H04L 41/5077* (2013.01); *H04L 47/20* (2013.01); *H04L 47/805* (2013.01)

(58) Field of Classification Search
CPC . H04L 41/0893; H04L 47/20; H04L 41/5077; H04L 47/805; H04L 63/0263; H04L 67/16; H04L 67/2814; H04L 67/2852; H04L 47/24
See application file for complete search history.

(56) References Cited

U.S. PATENT DOCUMENTS

| | | | | |
|---|---|---|---|---|
| 8,335,171 | B1 * | 12/2012 | Purkayastha | H04L 41/0806 370/254 |
| 9,667,571 | B2 * | 5/2017 | Anantharam | H04L 49/70 |
| 2003/0051049 | A1 * | 3/2003 | Noy | H04L 41/5054 709/238 |
| 2008/0196088 | A1 * | 8/2008 | Vinokurov | H04L 63/0263 726/5 |
| 2009/0228954 | A1 * | 9/2009 | Hu | H04M 15/66 726/1 |
| 2011/0055483 | A1 * | 3/2011 | Heller, Jr. | G06F 12/0875 711/125 |
| 2013/0212641 | A1 * | 8/2013 | Stiekes | H04L 63/306 726/1 |

(Continued)

OTHER PUBLICATIONS

Klaedtke et al., "Towards an access control scheme for accessing flows in SDN", 2015, IEEE, Retrieved online on Feb. 19, 2021 from IEEE Xplore (Year: 2015).*

*Primary Examiner* — Hitesh Patel
*Assistant Examiner* — Sandarva Khanal
(74) *Attorney, Agent, or Firm* — Chamberlain, Hrdlicka, White, Williams & Aughtry

(57) ABSTRACT

Methods and systems for managing network device fabrics. The methods and systems may entail the re-assignment of enforcement responsibilities, pertinent to one or more traffic management and/or access rules, from a service device to a network device fabric.

16 Claims, 13 Drawing Sheets

(56) References Cited

U.S. PATENT DOCUMENTS

| | | | |
|---|---|---|---|
| 2014/0010083 A1 | 1/2014 | Hamdi et al. | |
| 2014/0095724 A1* | 4/2014 | Yoakum | H04L 29/08054 |
| | | | 709/228 |
| 2014/0317684 A1 | 10/2014 | Porras et al. | |
| 2014/0376367 A1* | 12/2014 | Jain | H04L 63/0263 |
| | | | 370/230 |
| 2015/0229526 A1* | 8/2015 | Sabev | H04L 41/0846 |
| | | | 370/255 |
| 2016/0182370 A1 | 6/2016 | Stokking et al. | |
| 2016/0359913 A1* | 12/2016 | Gupta | H04L 41/22 |
| 2017/0019335 A1 | 1/2017 | Schultz et al. | |
| 2017/0155681 A1* | 6/2017 | Ashley | H04L 47/00 |
| 2017/0331739 A1* | 11/2017 | Sharma | H04L 63/02 |
| 2018/0337849 A1* | 11/2018 | Sharma | H04L 43/026 |
| 2019/0075133 A1* | 3/2019 | Chen | H04L 63/20 |
| 2019/0319918 A1 | 10/2019 | Wing et al. | |
| 2020/0252291 A1 | 8/2020 | Mittal et al. | |

\* cited by examiner

METHOD AND SYSTEM FOR CONSISTENT POLICY ENFORCEMENT THROUGH FABRIC OFFLOADING

CROSS-REFERENCE TO RELATED APPLICATIONS

This application claims priority under 35 U.S.C. § 19(e) to U.S. Provisional Patent Application No. 62/800,225, filed Feb. 1, 2019, which is incorporated herein by reference in its entirety.

BACKGROUND

In information technology (IT) networks, service devices, such as firewalls, may be distributed throughout a network and often provide crucial traffic management and/or access services.

SUMMARY

In general, in one aspect, the invention relates to a method for managing a network device fabric. The method includes obtaining, from a service device, a first service device policy, examining the first service device policy to identify a first set of qualifiers and a first traffic flow action, deriving, from the first service device policy, a first network device rule including the first set of qualifiers and the first traffic flow action, and making a first attempt at a fabric-wide deployment of the first network device rule, wherein, based on a success of the first attempt, enforcement of the first service device policy is offloaded onto the network device fabric.

In general, in one aspect, the invention relates to a system. The system includes a network device fabric including a plurality of interconnected network devices, a service device directly-connected to a network device of the network device fabric, and a control plane service (CPS) operatively connected to the network device fabric, and programmed to obtain, from the service device, a service device policy, examine the service device policy to identify a set of qualifiers and a traffic flow action, derive, from the service device policy, a network device rule including the set of qualifiers and the traffic flow action, and make an attempt at a fabric-wide deployment of the network device rule, wherein, based on a success of the attempt, enforcement of the service device policy is offloaded onto the network device fabric.

In general, in one aspect, the invention relates to a non-transitory computer readable medium (CRM) including computer readable program code, which when executed by a computer processor, enables the computer processor to obtain, from a service device, a service device policy, examine the service device policy to identify a set of qualifiers and a traffic flow action, derive, from the service device policy, a network device rule including the set of qualifiers and the traffic flow action, and make an attempt at a fabric-wide deployment of the network device rule, wherein, based on a success of the attempt, enforcement of the service device policy is offloaded onto a network device fabric.

Other aspects of the invention will be apparent from the following description and the appended claims.

DETAILED DESCRIPTION

Figure 1:
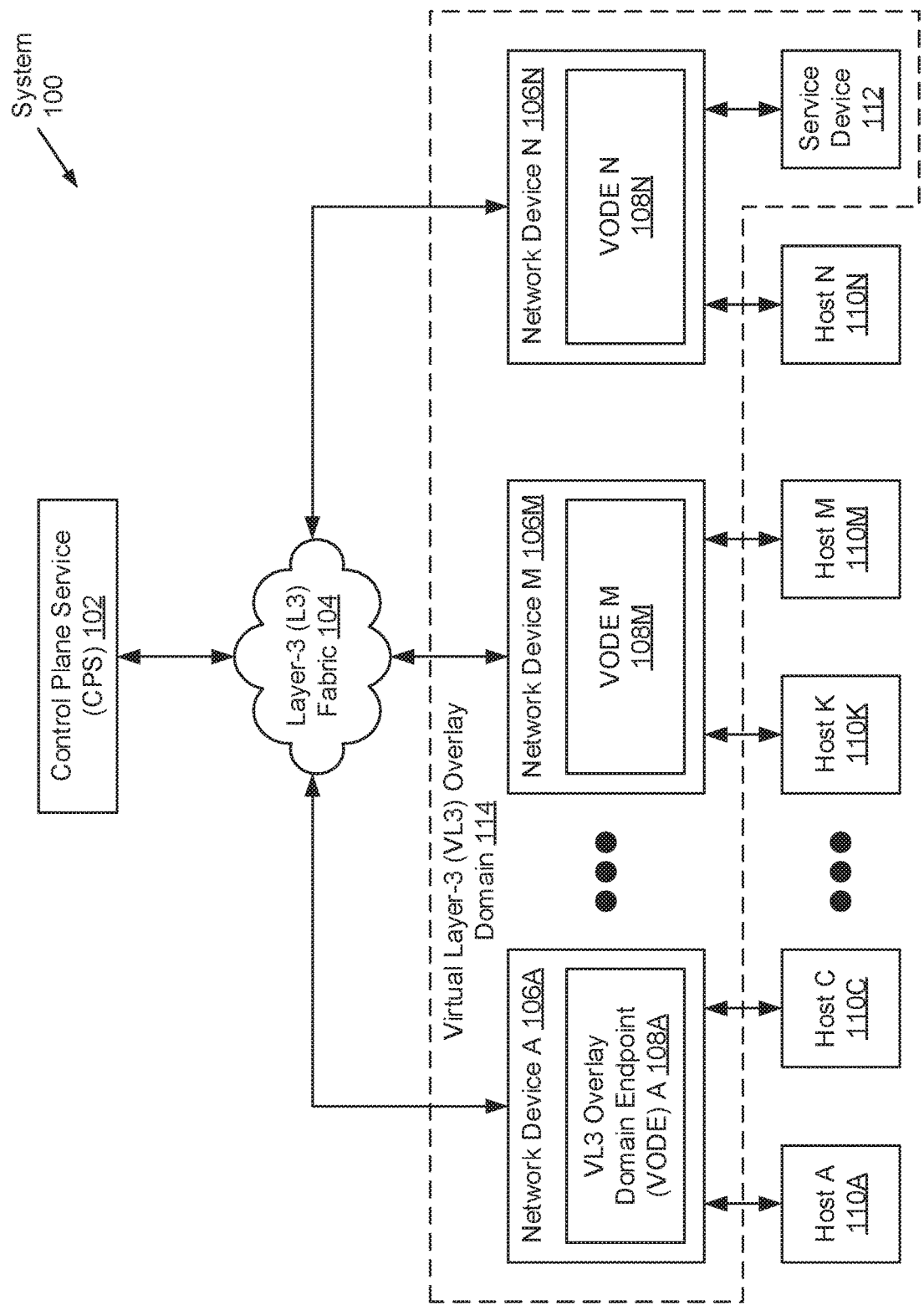
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and system for consistent policy enforcement through fabric offloading. Specifically, one or more embodiments of the invention entail the re-assignment of enforcement responsibilities, pertinent to one or more traffic management and/or access rules, from a service device to a network device fabric. That is, fabric offloading may entail the translation of any given service device policy, which may have been interpreted and enforced by the service device, to a set of network device rules, which may be interpreted by the network device fabric and, accordingly, allows the network device fabric to assume the enforcement of the relevant traffic management and/or access rule.

FIG. 1 shows a system in accordance with one or more embodiments of the invention. The system (100) may include multiple network devices (106A-106N) operatively connected to one another and a control plane service (CPS) (102) through a layer-3 (L3) fabric (104). Further, each network device (106A-106N) may be directly-connected to one or more hosts (110A-110N). Moreover, the system (100) may include one or more service devices (112), which may be directly connected to a subset of the network devices (106A-106N). Each of these components is described below.

In one embodiment of the invention, a network device (106A-106N) may represent a physical computing system that includes persistent storage, memory (e.g., random access memory (RAM), shared memory, etc.), one or more computer processors (e.g., integrated circuits) (including a switch chip or network processor), and two or more physical network interfaces (also referred to as ports). The computer processor(s) may be programmed to determine out of which network interface on the network device (106A-106N) to forward network traffic (e.g., media access control (MAC) frames). To that end, the computer processor(s) may include logical egress and ingress network interfaces that may connect to physical network interfaces on the network device (106A-106N). Further, each physical network device (106A-106N) may or may not be connected, through a physical medium (e.g., Ethernet cable, wire, etc.), to another system (100) component (e.g., a host (110A-110N), another network device (106A-106N), a service device (112), or the L3 fabric (104)).

In one embodiment of the invention, a network device (106A-106N) may include functionality to receive network traffic through a physical network interface, and determine whether to: (i) drop the network traffic; (ii) process the network traffic in accordance with installed device configurations; and/or (iii) send the network traffic, based on the processing, out another physical network interface towards a destination. Furthermore, the various network devices (106A-106N) interconnected throughout the system (100) may collectively be referred to as the network device (or switch) fabric (not shown).

In one embodiment of the invention, how the network device (106A-106N) makes a determination of whether to drop network traffic or send network traffic to another system (100) component, depends, in part, on whether the network device (106A-106N) operates as a layer-2 (L2) switch or a L3 switch (also referred to as a multilayer switch), which may perform at least some functions of a router. If the network device (106A-106N) is operating as a L2 switch, the network device (106A-106N) may use a destination MAC address along with a forwarding table or policy to determine out of which physical network interface to send the network traffic. If the network device (106A-106N) is operating as a L3 switch, the network device (106A-106N) may use a destination Internet Protocol (IP) address along with a routing table or policy to determine out of which physical network interface to send the network traffic. As a L3 switch, the network device (106A-106N) may also include functionality to write the MAC address of the next hop (or component) to receive the network traffic in place of its own MAC address (which the last hop or component to send the network traffic wrote) in the L2 information encapsulating the network traffic. If the network device (106A-106N) is operating as a multilayer switch, the network device (106A-106N) may include functionality to process network traffic using both MAC addresses and IP addresses.

Figure 5:
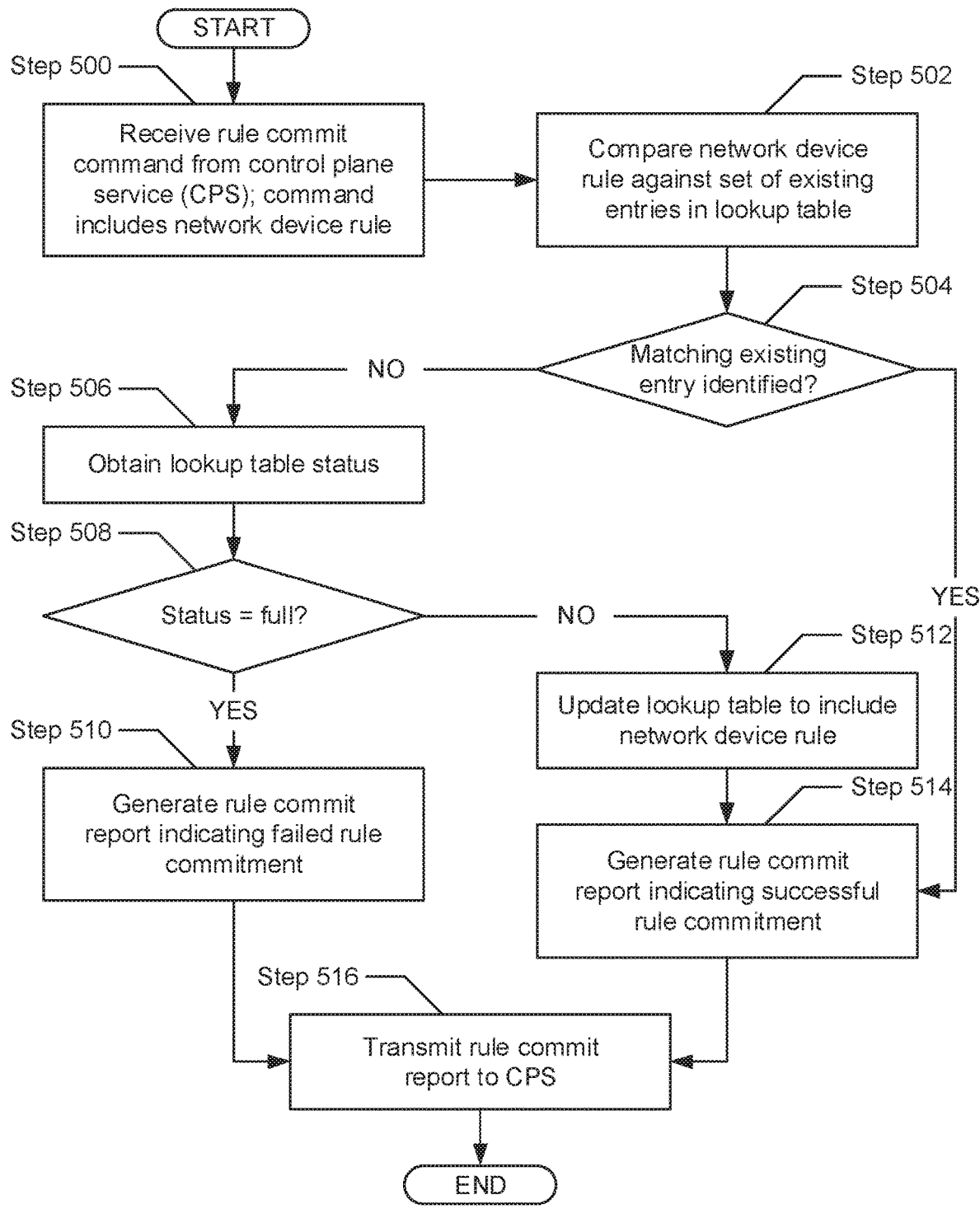
FIG. 5 shows a flowchart describing a method for committing network device rules in accordance with one or more embodiments of the invention.

In one embodiment of the invention, the persistent storage on a network device (106A-106N) may include any type of non-transitory computer readable medium that includes instructions (or computer readable program code), which when executed by the computer processor(s), enable the network device (106A-106N) to perform any of the functionalities described herein (see e.g., FIG. 5). Moreover, examples of a network device (106A-106N) may include, but are not limited to, a switch, a router, and a multilayer switch. Further, a network device (106A-106N) is not limited to the aforementioned specific examples.

In one embodiment of the invention, a network device (106A-106N) may include a virtual layer-3 (VL3) overlay domain endpoint (VODE) (108A-108N) executing thereon. A VODE (108A-108N) may refer to a logical intelligence (i.e., software) that may be tasked with originating and/or terminating virtual layer-3 (VL3) overlay domain tunnels (e.g., virtual extensible local area network (VXLAN) overlay domain tunnels, multi-protocol label switching (MPLS) overlay domain tunnels, generic routing encapsulation (GRE) overlay domain tunnels, etc.). Further, a VODE (108A-108N) may include functionality to: (i) encapsulate MAC frames into VL3 frames, where the MAC frames may be generated by or obtained from a directly-connected host (110A-110N), a virtual machine (VM) (not shown) executing on a directly-connected host (110A-110N), and a directly connected service device (112); (ii) transmit VL3 frames towards remote VODEs (108A-108N) executing on remote network devices (106A-106N) through the L3 fabric (104); (iii) receive other VL3 frames from these remote VODEs (108A-108N) via the L3 fabric (104); and (iv) decapsulate (i.e., remove the VL3 frame header information from) these other VL3 frames to obtain other MAC frames therefrom, where the other MAC frames may have been generated by remote hosts (110A-110N), remote VMs (not shown) executing on remote hosts (110A-110N), and remove service devices (112). By way of an example, a VL3 frame may be a VXLAN frame, whereas the virtual tunnel through which VXLAN frames traverse may be a VXLAN tunnel, and the VODE (108A-108N) wherefrom the VXLAN frames depart and/or arrive may be a virtual tunnel end point (VTEP). Embodiments of the invention are not limited to any specific implementation or protocol for generating VL3 frames and/or virtual tunnels.

In one embodiment of the invention, a host (110A-110N) may represent any physical computing system (e.g., implemented through software and computer hardware) that may be configured to generate, send, receive, and/or process requests and replies, either locally or over a network. A host (110A-110N) may include one or more computer processors, memory, and two or more physical network interfaces (also referred to as ports). Further, a host (110A-110N) may include functionality to generate, receive, and/or transmit network traffic (e.g., MAC frames). Examples of a host (110A-110N) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smartphone, a personal digital assistant (PDA), a table computer, or any other mobile device), or any other type of computing system that includes at least the aforementioned minimum requirements.

In one embodiment of the invention, the CPS (102) may represent a platform for the centralized management of and/or consolidation of state information for all or a portion of the network devices (106A-106N) in the system (100). The CPS (102) may be implemented on one or more physical or virtual devices, which may include at least one or more processors, memory, two or more physical network interfaces (also referred to as ports), and a data repository. In one embodiment of the invention, the CPS (102) may further include executable instructions (or computer readable program code) that may be stored in non-transitory computer readable media, which when executed, enable the CPS (102) to perform any of the functionalities described herein (see e.g., FIGS. 3A-4).

In one embodiment of the invention, the CPS (102) may include a data repository (not shown). The data repository may be a storage system or media for consolidating various forms of data. The data repository may be implemented across on or more physical and/or virtual storage units or devices, which may or may not be of the same type or co-located in a same computing device. Furthermore, the information consolidated in the data repository may be arranged using any storage mechanism (e.g., a filesystem, a database, a collection of tables or records, etc.). In one embodiment of the invention, the data repository may be implemented using persistent (i.e., non-volatile) storage. Examples of persistent storage may include, but are not limited to, optical storage, magnetic storage, NAND Flash Memory, NOR Flash Memory, Magnetic RAM (M-RAM), Spin Torque Magnetic RAM (ST-MRAM), Phase Change Memory (PCM), or any other data storage defined as non-volatile Storage Class Memory (SCM).

In one embodiment of the invention, a service device (112) may represent a physical or virtual computing system that includes functionality to provide a service to one or more network devices (106A-106N) and/or one or more hosts (110A-110N). A service device (112) may include at least one or more computer processors, memory, and two or more physical network interfaces (also referred to as ports). Further, a service device (112) may include functionality to process network traffic, redirected thereto from various VODEs (108A-108N), in accordance with the configuration of, and the specific service thus provided by, the service device (112). Subsequently, a service device (112) may include functionality to filter, mirror, store, forward, drop, transform, and/or perform any other action, or any combination thereof, to redirected network traffic, which may be afforded by the configuration and provided service of the service device (112). Examples of a service device (112) may include, but are not limited to, a network security device (e.g., a firewall device or a denial of service (DOS) attack scrubber), a network filtering device (e.g., a web content filter), a network data cache (e.g., a web-cache device), and a network load balancing device. Moreover, in one embodiment of the invention, a service device (112) may be reachable by (or operatively connected to) any VODE (108A-108N) in the system (100) through a virtual layer-3 (VL3) overlay domain (114). By way of an example, the VL3 overlay domain (114) may be a VXLAN overlay domain.

In one embodiment of the invention, the L3 fabric (104) may represent a set of interconnected network devices or systems, which operatively connect one or more CPSs (102) to each of the network devices (106A-106N) of the system (100). The L3 fabric (104) may include functionality to facilitate communications between these aforementioned components. Accordingly, the L3 fabric (104) may include any combination of local area network (LAN) and/or wide area network (WAN) (e.g., Internet) segments, which may employ any combination of wired and/or wireless connections and communication protocols.

While FIG. 1 shows a configuration of components, other system configurations may be used without departing from the scope of the invention. For example, the system (100) may further include one or more virtual machines (not shown), which may execute on any underlying hardware component portrayed in the system (100).

Figure 2A:
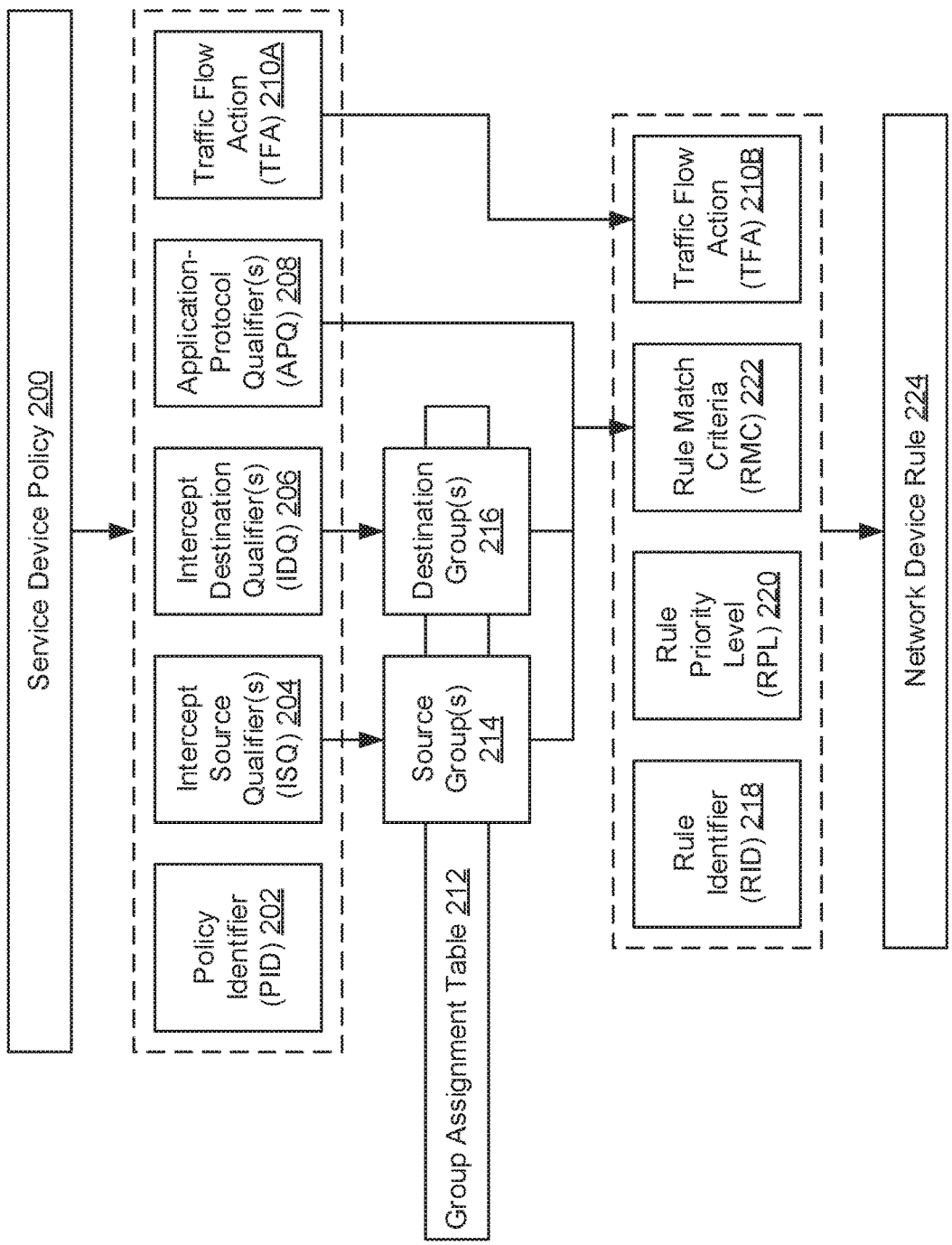
FIG. 2A shows associations between a service device policy and a network device rule in accordance with one or more embodiments of the invention.

FIG. 2A shows associations between a service device policy and a network device rule in accordance with one or more embodiments of the invention. A service device policy (200) may represent a traffic management and/or access rule, followed by a service device (see e.g., FIG. 1), for processing certain network traffic flows. The affected network traffic flows may be defined based on one or more qualifiers. Accordingly, a service device policy (200) may specify a policy identifier (PID) (202), zero or more intercept source qualifiers (ISQ) (204), zero or more intercept destination qualifiers (IDQ) (206), zero or more application-protocol qualifiers (APQ) (208), and one or more traffic flow actions (TFA) (210A). Each of these service device policy (200) components is described below.

In one embodiment of the invention, the PID (202) may represent any arbitrary-length character string used to uniquely identify the service device policy (200). For example, the PID (202) may be expressed as an alphanumeric string including one or more letters and/or numbers.

In one embodiment of the invention, an ISQ (204) (if any are specified) may represent a meta-datum (or a combination of metadata) associated with an origination end point of an intercept network traffic flow. The aforementioned origination end point may refer to a physical or virtual intercept network traffic flow source—e.g., a host (see e.g., FIG. 1) or a virtual machine wherefrom network traffic, sought for interception and inspection by a service device, had been generated. By way of examples, an ISQ (204) may include layer-2 (L2) information, layer-3 (L3) information, layer-4 (L4) information, other information, or any combination thereof, associated with an intercept network traffic flow origination end point. The aforementioned assortment of information is described in further detail below with respect to FIG. 2B.

In one embodiment of the invention, an IDQ (206) (if any are specified) may represent a meta-datum (or a combination of metadata) associated with a termination end point of an intercept network traffic flow. The aforementioned termination end point may refer to a physical or virtual intercept network traffic flow destination—e.g., a host (see e.g., FIG. 1) or a virtual machine whereto network traffic, sought for interception and inspection by a service device, had been addressed. By way of examples, an IDQ (206) may include L2 information, L3 information, L4 information, other information, or any combination thereof, associated with an intercept network traffic flow termination end point. The aforementioned assortment of information is described in further detail below with respect to FIG. 2B.

In one embodiment of the invention, the aforementioned intercept network traffic flow may pertain to any single transmission of one or more protocol data units (PDUs) (e.g., Ethernet media access control (MAC) frames, Internet Protocol (IP) packets, etc.) that may be sought for interception and inspection by a service device. Further, any given intercept network traffic flow may be intercepted at the network device directly-connected to the origination end point, and subsequently, rather than being forwarded to the termination end point, the given intercept network traffic flow may be redirected to a service device for inspection.

In one embodiment of the invention, an APQ (208) (if any are specified) may represent a meta-datum (or a combination of metadata) associated with a particular application and/or protocol pertinent to an intercept network traffic flow. The aforementioned application may refer to a sender or receiver computer program (executing on an origination or termination end point (described above)) of PDU payload(s) encapsulated in the intercept network traffic flow. On the other hand, the aforementioned protocol may refer to a set of rules or procedures by which the intercept network traffic flow is communicated between the origination and termination end points. By way of examples, an APQ (208) may include an application identifier uniquely identifying an application (e.g., an e-mail computer program, a database computer program, etc.) pertinent to the intercept network traffic flow, a protocol identifier uniquely identifying a protocol (e.g., Transmission Control Protocol (TCP), User Datagram Protocol (UDP), Hypertext Transfer Protocol (HTTP), etc.) used in the communication of the intercept network traffic flow, or a combination thereof.

In one embodiment of the invention, a TFA (210A) may represent a given action applied to network traffic flows satisfying or matching the various qualifiers (e.g., ISQ (204), IDQ (206), and/or APQ (208)) definitive of the service device policy (200). For example, if the TFA (210A) specifies a PERMIT action, then any network traffic flow(s), matching the qualifier(s) of the service device policy (200), may be permitted to proceed towards their respective destination(s)—i.e., termination end point(s) (described above). By way of another example, if the TFA (210A) specifies a DENY action, then any network traffic flow(s), matching the qualifier(s) of the service device policy (200), may be dropped or discarded. The TFA (210A) may not be limited to these aforementioned actions. In fact, the TFA (210A) may specify other actions, relevant to the configuration of and/or the services provided by the service device (see e.g., FIG. 1) with which the service device policy (200) may be associated, without departing from the scope of the invention.

In one embodiment of the invention, a network device rule (224) may represent a traffic management and/or access rule, followed by a network device (see e.g., FIG. 1), for processing certain network traffic flows, which may or may not be redirected to a service device for further inspection. The affected network flows may be defined based on information matching (described below). Accordingly, a network device rule (224) may specify a rule identifier (RID) (218), a rule priority level (RPL) (220), rule match criteria (RMC) (222), and one or more TFAs (210). Each of these network device rule (224) components is described below.

In one embodiment of the invention, the RID (218) may represent any arbitrary-length character string used to uniquely identify the network device rule (224). For example, the RID (218) may be expressed using an alphanumeric string including one or more letters and/or numbers.

In one embodiment of the invention, the RPL (220) may refer to a numeric (e.g., 0 to 10) or categorical value (e.g., 'low', 'medium', 'high') that reflects the relative importance of the network device rule (224) compared to other network device rules (not shown). The RPL (220) may be used to select which network device rule (224) to apply should multiple network device rules match with the lookup key utilized during a lookup of the lookup table. By way of an example, the lookup table may refer to ternary content addressable memory (TCAM) residing on a network device.

In one embodiment of the invention, the RMC (222) may represent characteristic information that defines a certain network traffic flow to which the network device rule (224) applies. Specifically, the aforementioned characteristic information may refer to a meta-datum (or a combination of metadata) pertinent to the certain network traffic flow, which may be derived from any subset or all of the following: (a) the ISQ (204); (b) the IDQ (206); and/or (c) the APQ (208), specified in a relevant service device policy (200) (described above). With respect to the ISQ (204) and IDQ (206), which pertain to the origination and termination end points, respectively, of an intercept network traffic flow, the RMC (222) may reflect their contribution to characteristic information through respective groups into which the ISQ (204) and IDQ (206) may be classified. Accordingly, by way of a group assignment table (212) (see e.g., FIG. 2B), the ISQ (204) may be classified or mapped into one or more source groups (214), whereas the IDQ (206) may be classified or mapped into one or more destination groups (216). Subsequently, a source group (214) may refer to a classification assigned to the origination end point of the certain network traffic flow to which the network device rule (224) applies. Meanwhile, a destination group (216) may refer to a classification assigned to the termination end point of the certain network traffic flow to which the network device rule (224) applies.

In one embodiment of the invention, a TFA (210B) may represent a given action applied to network traffic flows satisfying or matching the RMC (222). For example, if the TFA (210B) specifies a PERMIT action, then any network traffic flow(s), matching the RMC (220) of the network device rule (224), may be permitted to proceed towards their respective destination(s)—i.e., termination end point(s) (described above). By way of another example, if the TFA (210B) specifies a DROP or DENY action, then any network traffic flow(s), matching the RMC (222) of the network device rule (224), may be dropped or discarded accordingly. By way of yet another example, if the TFA (210B) specifies a REDIRECT or NEXTHOP action, then any network traffic flow(s), matching the RMC (222) of the network device rule (224), may be redirected to a specified service device for inspection or a next hop. The TFA (210B) may not be limited to these aforementioned actions. That is, the TFA (210B) may specify other actions without departing from the scope of the invention.

In one embodiment of the invention, any given network device rule (224) described hereinafter may identify as: (a) a fail-close network device rule; (b) a redirect network device rule; or (c) an offload network device rule. These network device rule (224) subclasses are described in further detail below with respect to FIG. 2C.

Figure 2B:
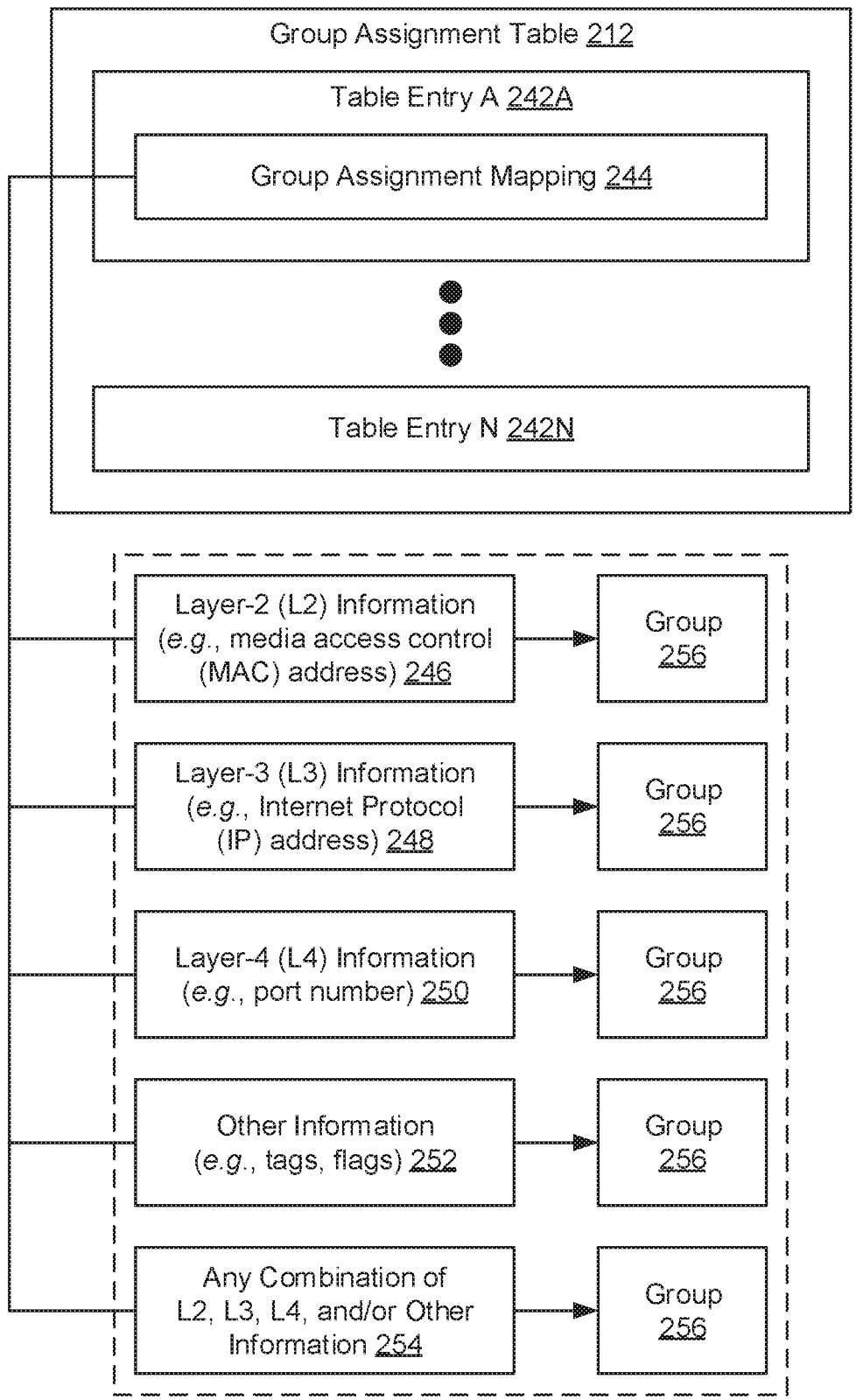
FIG. 2B shows a group assignment table in accordance with one or more embodiments of the invention.

FIG. 2B shows a group assignment table in accordance with one or more embodiments of the invention. The group assignment table (212) may refer to a data object or structure dedicated to storing group assignment mappings (244), which may reside on a control plane service (CPS) and one or more network devices (see e.g., FIG. 1) of a network. Each group assignment mapping (244) may be tracked in the form of a table entry (242A-242N), and may pertain to binding certain network traffic flow metadata to group classifications. Accordingly, each group assignment mapping (244) may map layer-2 (L2) information (246), layer-3 (L3) information (248), layer-4 (L4) information (250), other information (252), or any combination thereof (254), to a group (256). Each of these items is described below.

In one embodiment of the invention, L2 information (246) may refer to data link layer information (or metadata) descriptive of a network traffic flow. Data link layer information may be directed to the local forwarding of protocol data units (PDUs), forming the network traffic flow, between multiple interconnected devices within a local area network (LAN) or a subnet (i.e., subnetwork) of a wide area network (WAN) such as the Internet. Further, the L2 information (246) may or may not be specified within header information of the aforementioned PDU(s). Examples of L2 information (246) may include, but are not limited to, a source media access control (MAC) address associated with an origination end point of the network traffic flow, and a destination MAC address associated with a termination end point of the network traffic flow.

In one embodiment of the invention, L3 information (248) may refer to network layer information (or metadata) descriptive of a network traffic flow. Network layer information may be directed to the inter-network routing of PDUs, forming the network traffic flow, between multiple interconnected LANs or subnets of a WAN such as the Internet. Further, the L3 information (248) may or may not be specified within header information of the aforementioned PDU(s). Examples of L3 information (248) may include, but are not limited to, a source Internet Protocol (IP) address associated with an origination end point of the network traffic flow, a destination IP address associated with a termination end point of the network traffic flow, a source virtual routing and forwarding (VRF) domain associated with the origination end point of the network traffic flow, and a destination VRF domain associated with the termination end point of the network traffic flow.

In one embodiment of the invention, L4 information (250) may refer to transport layer information (or metadata) descriptive of a network traffic flow. Transport layer information may be directed to the delivery of PDUs, forming the network traffic flow, between appropriate applications hosted on interconnected devices throughout a network (e.g., one or more LANs, one or more subnets of a WAN such as the Internet, etc.). Further, the L4 information (250) may or may not be specified within header information of the aforementioned PDU(s). Examples of L4 information (250) may include, but are not limited to, a source network interface (or port) used by an appropriate application executing on an origination end point of the network traffic flow, a destination network interface (or port) used by an appropriate application executing on a termination end point of the network traffic flow, and a byte-length descriptive of a length of the PDU(s) forming the network traffic flow.

In one embodiment of the invention, other information (252) may refer to miscellaneous information (or metadata) descriptive of a network traffic flow. Miscellaneous information may be directed to any information not specifically recognized as L2 information (246), L3 information (248), and/or L4 information (250). Further, the other information (252) may or may not be specified within header information of one or more PDUs, which may form the network traffic flow. Examples of other information (252) may include, but are not limited to, a source virtual local area network (VLAN) tag for a source VLAN associated with an origination end point of the network traffic flow, a destination VLAN tag for a destination VLAN associated with a termination end point of the network traffic flow, a type of service (or service precedence) associated with the network traffic flow, and a protocol used in the encapsulation of the data payload of the PDU(s) forming the network traffic flow.

In one embodiment of the invention, combination information (254) may refer to any arrangement of L2 information (246), L3 information (248), L4 information (250), and/or other information (252) (or metadata) descriptive of a network traffic flow. Combination information (254) may entail multiple pieces of information pertaining to a single information class—e.g., multiple pieces of information classified as L2 information (246). Alternatively, combination information (254) may entail multiple pieces of information that collectively span across multiple information classes—e.g., a first piece of information classified as L2 information (246), second and third pieces of information classified as L3 information (248), as well as a fourth piece of information classified as other information (252).

In one embodiment of the invention, a group (256) may represent a classification used to compress a list of metadata, descriptive of or pertinent to one or more network traffic flows, into a single, referenceable entity. The compression of multiple network traffic flow metadata, into far fewer groups (256), may result in the commitment or accommodation of far fewer network device rules into limited space lookup tables residing on network devices. Characterized through the incorporation of one or more groups (256) to replace and represent a potentially greater cardinality of network traffic flow metadata (as the specified rule match criteria (RMC) (see e.g., FIG. 2A)), each of the aforementioned far fewer network device rules may also be referred to herein as a group-referenced network device rule. In contrast, network device rules that refrain from the incorporation of groups (256) and, subsequently, retain the specification of separate network traffic flow meta-datum (or any combination of traffic flow metadata) to define their respective RMCs, may also be referred to herein as metadata-referenced network device rules.

In one embodiment of the invention, each group-referenced network device rule may substitute, and account for, multiple metadata-referenced network device rules. That is, because a given group (256) may compress any arbitrary-cardinality list of network traffic flow metadata, a group-referenced network device rule incorporating the given group (256) may subsume multiple metadata-referenced network device rules, where each metadata-referenced network device rule may have incorporated one meta-datum (or a subset of metadata) that which the given group (256) compresses. In view of the aforementioned, utilization of the limited, allocated space, definitive of lookup tables on network devices, may be optimized when the deployment and commitment of group-referenced network device rules, versus metadata-referenced network device rules, are considered.

Figure 2C:
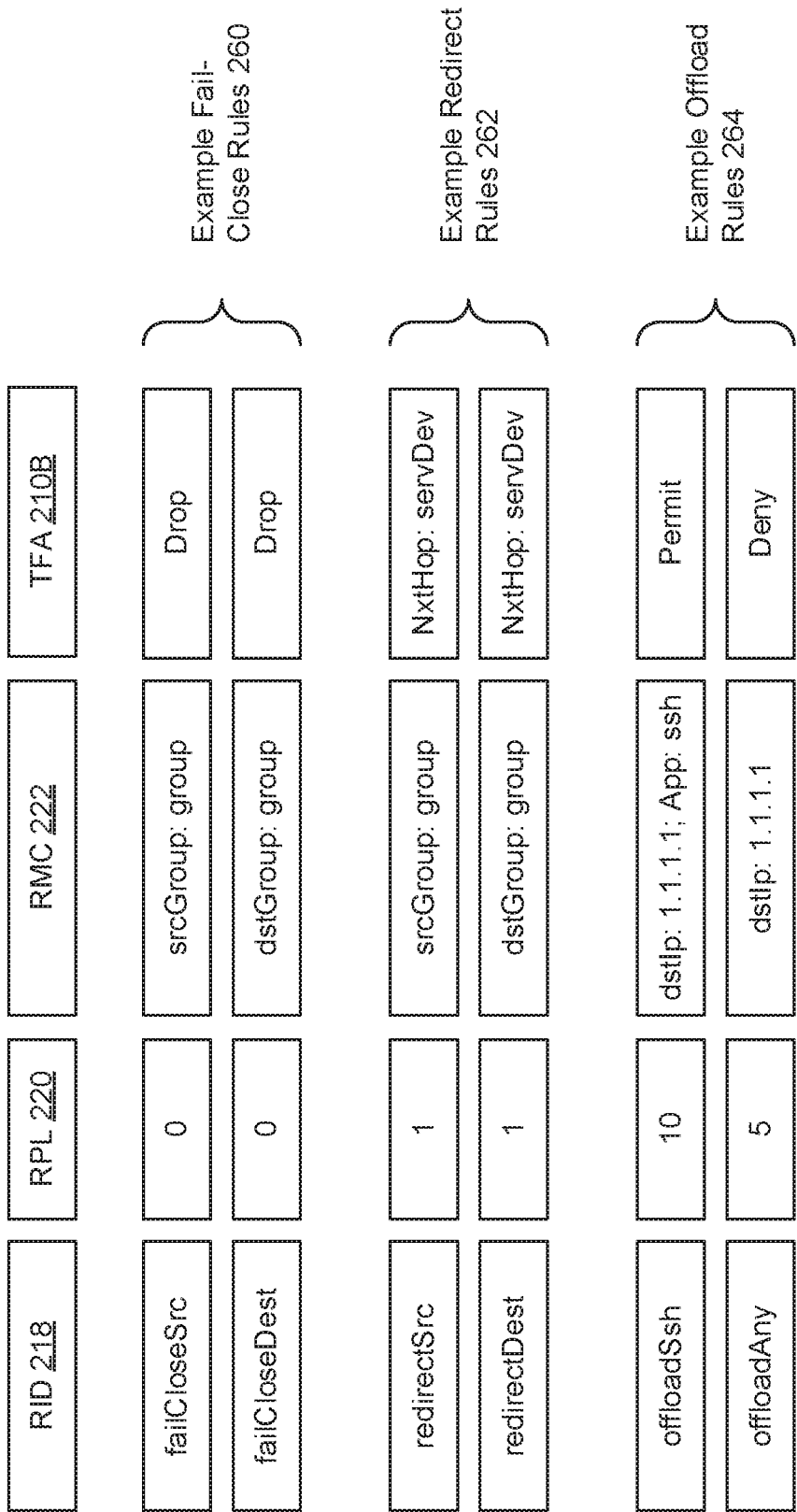
FIG. 2C shows example network device rules in accordance with one or more embodiments of the invention.

FIG. 2C shows example network device rules in accordance with one or more embodiments of the invention. The following example network device rules are for explanatory purposes only and not intended to limit the scope of the invention. As briefly mentioned above, any given network device rule described herein may identify as: (a) a fail-close network device rule (260); (b) a redirect network device rule (262); or (c) an offload network device rule (264). Each of these network device rule subclasses is described below.

In one embodiment of the invention, a fail-close network device rule (260) may represent a network device rule subclass directed to the dropping (or discarding) of intercept network traffic flows should a service device be considered unreachable. A service device may be unreachable for any number of reasons, which may include, but are not limited to, scheduled maintenance, unexpected power outages, and failure events induced through, for example, hardware failure, physical network severance, hacker intervention, other anomalies, or any combination thereof. A reachability or unreachability of a service device may be determined using a heartbeat networking protocol—e.g., a continuous exchange of messages to and from the service device, to monitor the availability of the service device. Further, intercept network traffic flows may refer to network traffic flows sought for interception and inspection by a service device. When the service device, to which one or more network traffic flows have been redirected, is unreachable, the network traffic flow(s) may proceed towards their respective termination end points (described above) without the protective measures or services provided by the service device. This free-flow of network traffic may subsequently create security holes and/or other unwanted effects throughout the network. A fail-close network device rule (260) therefore ensures an implicit dropping (or discarding) of these intercept network traffic flows when the service device, to which the intercept network traffic flows may be redirected, is unreachable, thereby curbing or preventing the instantiation and spread of unwanted network vulnerabilities.

A couple of non-limiting examples of a fail-close network device rule (260) are portrayed in FIG. 2C. Distinguishing characteristics of any given fail-close network device rule (260) may include, but are not limited to: (a) the exhibition of a traffic flow action (TFA) (210B) reflecting a DROP or DENY action; (b) the exhibition of rule match criteria (RMC) (222) incorporating one or more groups (identifying fail-close network device rules (260) as group-referenced network device rules) (see e.g., FIG. 2B); and (c) the exhibition of a rule priority level (RPL) (220) reflecting a low-tier priority level, from a spectrum of possible priority levels, across the three network device rule subclasses. That is, with respect to rule prioritization, fail-close network device rules (260) may often reflect RPLs (220) that are lower than RPLs (220) exhibited by both the redirect and offload network device rule (262, 264) subclasses.

In one embodiment of the invention, a redirect network device rule (262) may represent a network device rule subclass directed to the redirection (or detour) of network traffic flows to alternative destinations not representative of their respective original termination end points (described above). For example, a redirect network device rule (262) may match to, and subsequently, intercept and redirect certain network traffic flows to a service device for inspection. Network traffic flows redirected to a service device may also be referred to herein as intercept network traffic flows. By way of another example, a redirect network device rule (262) may match to, and subsequently, intercept and redirect certain other network traffic flows to another specified next hop (e.g., another network device or host).

A couple of non-limiting examples of a redirect network device rule (262) are portrayed in FIG. 2C. Distinguishing characteristics of any given redirect network device rule (262) may include, but are not limited to: (a) the exhibition of a TFA (210B) reflecting a REDIRECT or NEXTHOP action; (b) the exhibition of RMC (222) incorporating one or more groups (identifying fail-close network device rules (260) as group-referenced network device rules) (see e.g., FIG. 2B); and (c) the exhibition of a RPL (220) reflecting a mid-tier priority level, from a spectrum of possible priority levels, across the three network device rule subclasses. That is, with respect to rule prioritization, redirect network device rules (262) may often reflect RPLs (220) that are lower than RPLs (220) exhibited by the offload network device rule (264) subclass (described below), yet higher than RPLs (220) exhibited by the fail-close network device rule (260) subclass.

In one embodiment of the invention, an offload network device rule (264) may represent a network device rule subclass directed to the literal translation of a given service device policy, from which the various network device rule subclasses (260, 262, 264) may be derived, into a network device rule format (see e.g., FIG. 2A) in which a network device may interpret and apply to matching network traffic flows.

A couple of non-limiting examples of an offload network device rule (264) are portrayed in FIG. 2C. Distinguishing characteristics of any given offload network device rule (264) may include, but are not limited to: (a) the exhibition of a TFA (210B) reflecting the same TFA (210A) (see e.g., FIG. 2A) specified in the service device policy from which at least the offload network device rule (264) is derived; (b) the exhibition of RMC (222) incorporating the one or more qualifiers—e.g., intercept source qualifier(s) (ISQ), intercept destination qualifier(s) (IDQ), and/or application-protocol qualifier(s) (APQ) (identifying offload network device rules (264) as metadata-referenced network device rules)—specified in the service device policy from which at least the offload network device rule (264) is derived; and (c) the exhibition of a RPL (220) reflecting a high-tier priority level, from a spectrum of possible priority levels, across the three network device rule subclasses. That is, with respect to rule prioritization, offload network device rules (264) may often reflect RPLs (220) that are higher than RPLs (220) exhibited by both the fail-close and redirect network device rule (260, 262) subclasses.

FIGS. 3A-3G show flowcharts describing a method for offloading service device policies in accordance with one or more embodiments of the invention. The various steps outlined below may be performed by the control plane service (CPS) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Figure 3A:
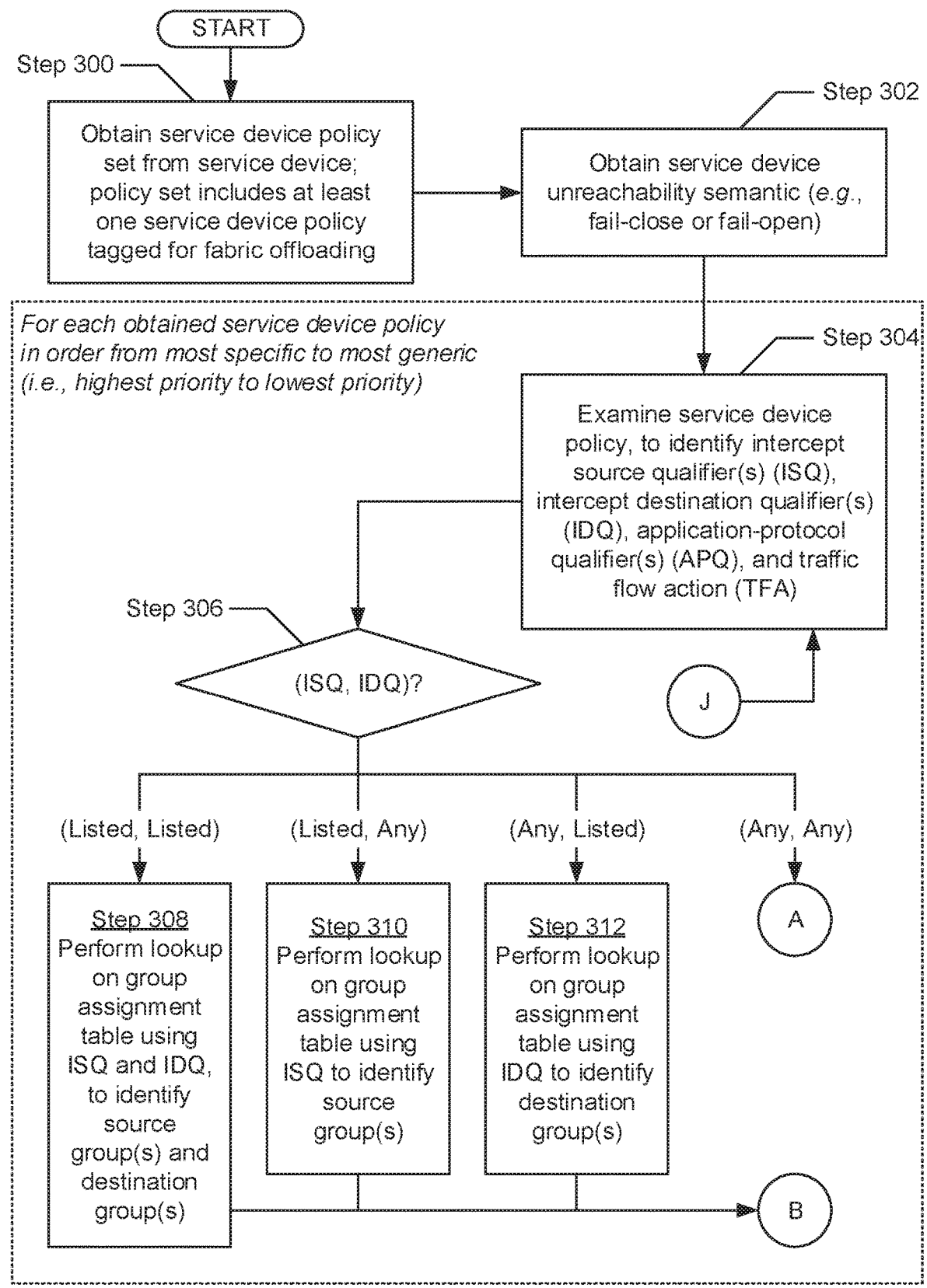
FIGS. 3A-3G show flowcharts describing a method for offloading service device policies in accordance with one or more embodiments of the invention.

Turning to FIG. 3A, in Step 300, a service device policy set is obtained from a service device. In one embodiment of the invention, the service device policy set may include one or more service device policies (see e.g., FIG. 2A) that have been tagged for fabric offloading. A service device policy may represent a traffic management and/or access rule, which may define the functionality of a service device (see e.g., FIG. 1) and may be directed to processing certain network traffic flows. Further, fabric offloading may refer to the re-assignment of enforcement responsibilities, pertinent to one or more traffic management and/or access rules, from the service device to a network device fabric. That is, fabric offloading may entail the translation of any given service device policy, which may have been interpreted and enforced by the service device, to a set of network device rules, which may be interpreted by the network device fabric and, accordingly, allows the network device fabric to assume the enforcement of the relevant traffic management and/or access rule. The network device fabric may refer to the collection of interconnected network devices that form a network. Moreover, the service device policy set may be tagged (or selected) manually by administrators of the network or, alternatively, automatically by an intelligence executing on the service device, which may tag (or select) service device policies for fabric offloading based on various monitored metrics.

In Step 302, a service device unreachability semantic is obtained. In one embodiment of the invention, the service device unreachability semantic may represent a fallback protocol to follow should the service device be unreachable. The service device may be unreachable for any number of reasons, which may include, but are not limited to, scheduled maintenance, unexpected power outages, and failure events induced through, for example, hardware failure, physical network severance, hacker intervention, other anomalies, or any combination thereof. A reachability or unreachability of the service device may be determined using a heartbeat networking protocol—e.g., a continuous exchange of messages between the CPS and the service device, to monitor the availability of the service device. Further, the service device unreachability semantic may reflect: (a) a fail-close unreachability semantic; or (b) a fail-open unreachability semantic. The fail-close unreachability semantic may ensure the dropping (or discarding) of any and all intercept network traffic flows should the service device be unreachable. Alternatively, the fail-open unreachability semantic may ensure the proceeding of any and all intercept network traffic flows, to their respective termination end points, should the service device be unreachable. An intercept network traffic flow may refer to a network traffic flow sought for interception and inspection by the service device.

Hereinafter, the remaining steps (i.e., Steps 304 through 386) outlined below may be performed for each service device policy (of the service device policy set obtained in Step 300). Further, the order, in which the one or more obtained service device policies may be processed, may be specificity-based. That is, the processing of more specific (or less generic) service device policies may be prioritized over less specific (or more generic) service device policies. In one embodiment of the invention, the specificity of a given service device policy may be determined based on the quantity of qualifiers—e.g., intercept source qualifier(s) (ISQ), intercept destination qualifier(s) (IDQ), and/or application-protocol qualifier(s) (APQ) (see e.g., FIG. 2A)—that may be definitive of the given service device policy. For example, a first service device policy may be more specific (and thus associate with a higher processing priority) than a second service device policy because the number of qualifiers included in, and required to invoke, the first service device policy exceeds the number of qualifiers included in, and required to invoke, the second service device policy. Accordingly, the second service device policy may be more generic (and thus associate with a lower processing priority).

In Step 304, the service device policy (currently being processed) is examined. In one embodiment of the invention, examination of the service device policy may identify the ISQ, IDQ, and/or APQ (if any) specified in the service device policy (see e.g., FIG. 2A). Further, examination of the service device policy may also identify one or more traffic flow action(s) (TFA) specified therein.

In Step 306, a determination is made as to whether a tuple including respective states for the ISQ and IDQ (identified in Step 304) is one of four possible combinations. The state of the ISQ may be directed to a LISTED state should at least one meta-datum, associated with an origination end point of an intercept network traffic flow, be specified in the service device policy. Similarly, the state of the IDQ may be directed to a LISTED state should at least one meta-datum, associated with a termination end point of the intercept network traffic flow, be specified in the service device policy. Alternatively, the state of the ISQ and/or IDQ may be directed to an ANY state should zero metadata, associated with the origination or termination end points, respectively, be specified in the service device policy.

Accordingly, in one embodiment of the invention, if it is determined that both the ISQ and the IDQ reflect the LISTED state—i.e., (ISQ, IDQ)=(LISTED, LISTED)—then the process proceeds to Step 308. In another embodiment of the invention, if it is alternatively determined that the ISQ reflects the LISTED state while the IDQ reflects the ANY state—i.e., (ISQ, IDQ)=(LISTED, ANY)—then the process alternatively proceeds to Step 310. In yet another embodiment of the invention, if it is alternatively determined that the ISQ reflects the ANY state while the IDQ reflects the LISTED state—i.e., (ISQ, IDQ)=(ANY, LISTED)—then the process alternatively proceeds to Step 312. On the other hand, in yet another embodiment still of the invention, if it is alternatively determined that both the ISQ and the IDQ reflect the ANY state—i.e., (ISQ, IDQ)=(ANY, ANY)—then the process alternatively proceeds to Step 372 (see e.g., FIG. 3F).

In Step 308, after determining (in Step 306) that both the ISQ and the IDQ (identified in Step 304) reflect the LISTED state—i.e., (ISQ, IDQ)=(LISTED, LISTED)—a lookup is performed on a group assignment table (see e.g., FIG. 2B) using the ISQ and the IDQ. Specifically, in one embodiment of the invention, the one or more origination end point metadata, representative of the ISQ, may be compared against various group assignment mappings stored in the group assignment table, to identify one or more source groups. Similarly, the one or more termination end point metadata, representative of the IDQ, may be compared against the various group assignment mappings, to identify one or more destination groups. Hereinafter, the process proceeds to Step 316 (see e.g., FIG. 3B).

In Step 310, after determining (in Step 306) that the ISQ and the IDQ (identified in Step 304) reflect the LISTED and ANY states, respectively—i.e., (ISQ, IDQ)=(LISTED, ANY)—a lookup is performed on a group assignment table (see e.g., FIG. 2B) using the ISQ. Specifically, in one embodiment of the invention, the one or more origination end point metadata, representative of the ISQ, may be compared against various group assignment mappings stored in the group assignment able, to identify one or more source groups. Hereinafter, the process proceeds to Step 316 (see e.g., FIG. 3B).

In Step 312, after determining (in Step 306) that the ISQ and the IDQ (identified in Step 304) reflect the ANY and LISTED states, respectively—i.e., (ISQ, IDQ)=(ANY, LISTED)—a lookup is performed on a group assignment table (see e.g., FIG. 2B) using the IDQ. Specifically, in one embodiment of the invention, the one or more termination end point metadata, representative of the IDQ, may be compared against various group assignment mappings stored in the group assignment table, to identify one or more destination groups. Hereinafter, the process proceeds to Step 316 (see e.g., FIG. 3B).

Figure 3B:
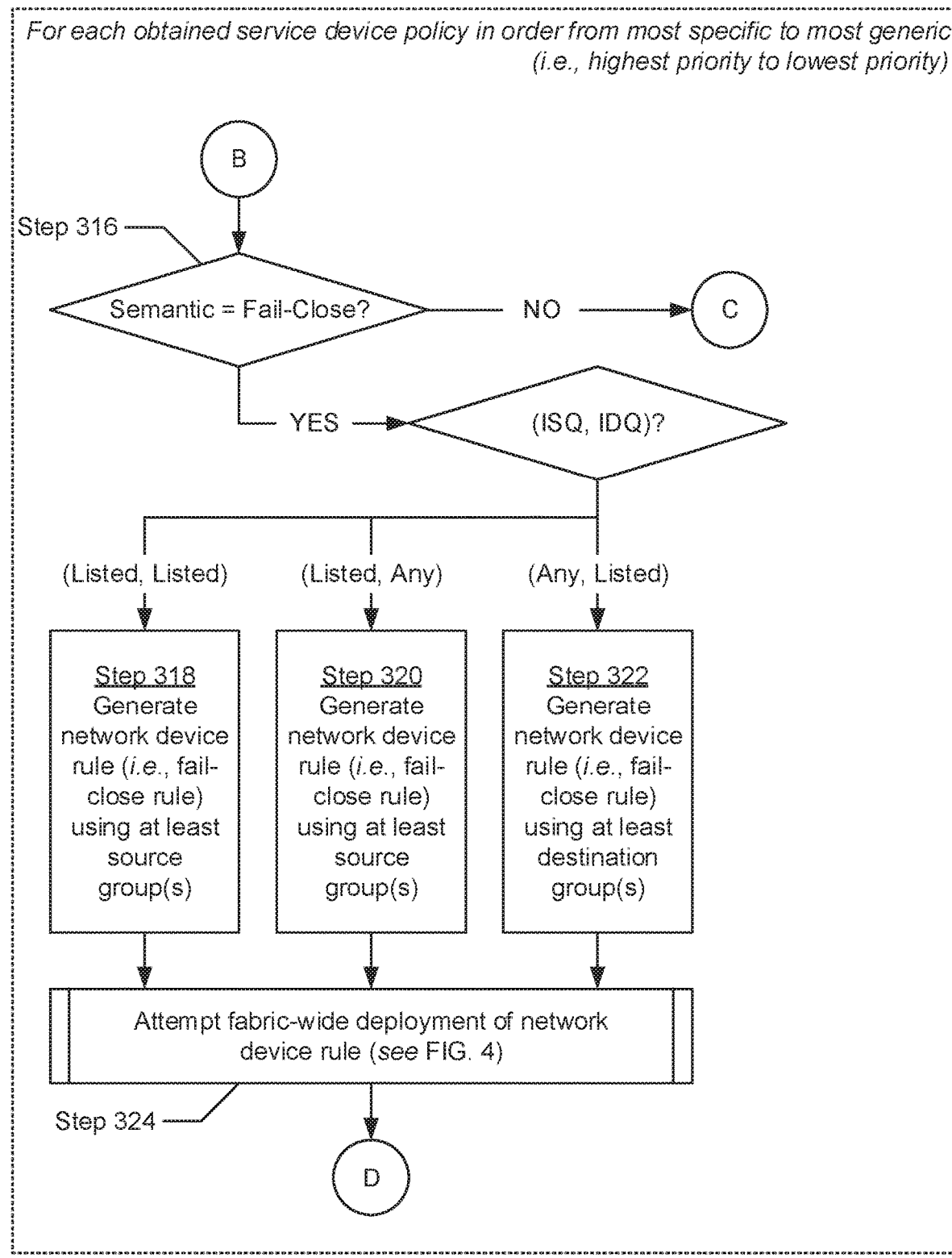

Turning to FIG. 3B, in Step 316, following the identification of one or more source groups and/or destination groups (in Step 308, Step 310, or Step 312), a determination is made as to whether the service device unreachability semantic (obtained in Step 302) is directed to a fail-close unreachability semantic (described above). Accordingly, in one embodiment of the invention, if it is determined that the service device unreachability semantic is directed to the fail-close unreachability semantic, then the process proceeds to Step 318, Step 320, or Step 322 (depending on the reflected ISQ and IDQ states (determined in Step 306)). On the other hand, in another embodiment of the invention, if it is alternatively determined that the service device unreachability semantic is instead directed to the fail-open unreachability semantic (described above), then the process alternatively proceeds to Step 342, Step 344, or Step 346 (see e.g., FIG. 3D) (depending on the reflected ISQ and IDQ states (determined in Step 306)).

In Step 318, after determining (in Step 316) that the service device unreachability semantic (obtained in Step 302) is directed to a fail-close unreachability semantic, and based on both the ISQ and the IDQ (identified in Step 304) reflecting the LISTED state—i.e., (ISQ, IDQ)=(LISTED, LISTED)—a network device rule is generated using at least the source group(s) (identified in Step 308). In one embodiment of the invention, the generated network device rule may pertain to the fail-close network device rule subclass (see e.g., FIG. 2C). Further, the generated network device rule may incorporate the identified source group(s) as the rule matching criteria (RMC) specified therein (see e.g., FIG. 2A).

In Step 320, after determining (in Step 316) that the service device unreachability semantic (obtained in Step 302) is directed to a fail-close unreachability semantic, and based on the ISQ and the IDQ (identified in Step 304) reflecting the LISTED and ANY states, respectively—i.e., (ISQ, IDQ)=(LISTED, ANY)—a network device rule is generated using at least the source group(s) (identified in Step 310). In one embodiment of the invention, the generated network device rule may pertain to the fail-close network device rule subclass (see e.g., FIG. 2C). Further, the generated network device rule may incorporate the identified source group(s) as the RMC specified therein (see e.g., FIG. 2A).

In Step 322, after determining (in Step 316) that the service device unreachability semantic (obtained in Step 302) is directed to a fail-close unreachability semantic, and based on the ISQ and the IDQ (identified in Step 304) reflecting the ANY and LISTED states, respectively—i.e., (ISQ, IDQ)=(ANY, LISTED)—a network device rule is generated using at least the destination group(s) (identified in Step 312). In one embodiment of the invention, the generated network device rule may pertain to the fail-close network device rule subclass (see e.g., FIG. 2C). Further, the generated network device rule may incorporate the identified destination group(s) as the RMC specified therein (see e.g., FIG. 2A).

In Step 324, a fabric-wide deployment of the network device rule (generated in Step 318, Step 320, or Step 322) is attempted. The fabric-wide attempt at deploying the network device rule is described in further detail below with respect to FIG. 4. Hereinafter, the process proceeds to Step 330 (see e.g., FIG. 3C).

Figure 3C:
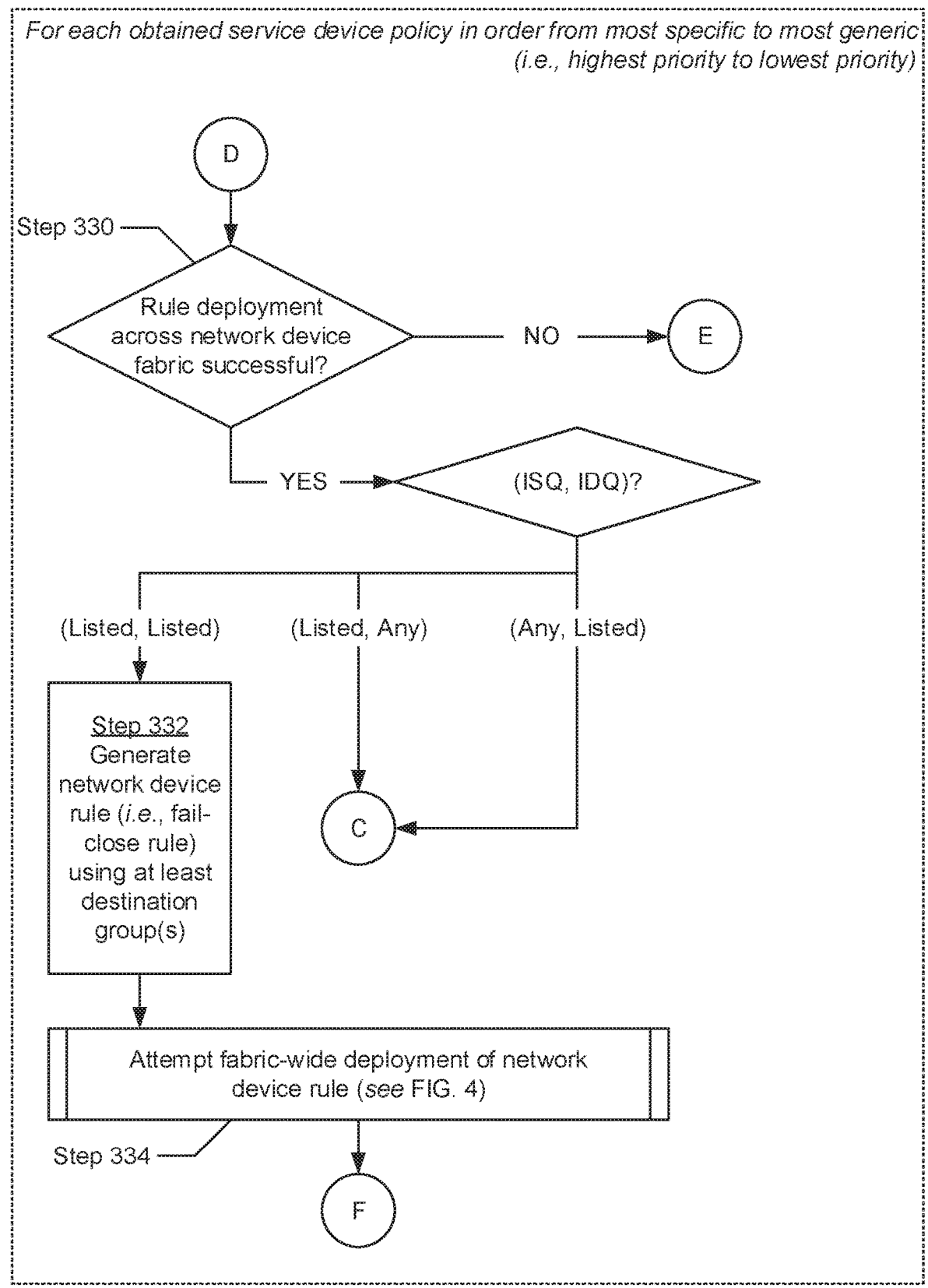

Turning to FIG. 3C, in Step 330, following the attempted fabric-wide deployment (in Step 324) of the network device rule (generated in Step 318, Step 320, or Step 322), a determination is made as to whether the aforementioned fabric-wide deployment attempt had been successful. Success of the fabric-wide deployment attempt may be contingent on a commitment of the aforementioned network device rule on and by all network devices forming the network device fabric (described above). Alternatively, failure of the fabric-wide deployment attempt may reflect that at least one network device, of the network device fabric, was not able to commit the aforementioned network device rule. Accordingly, in one embodiment of the invention, if it is determined that the aforementioned fabric-wide deployment attempt had been a success, then the process proceeds to Step 332, or Step 344 or Step 346 (see e.g., FIG. 3D) (depending on the reflected ISQ and IDQ states (determined in Step 306)). On the other hand, in another embodiment of the invention, if it is alternatively determined that the aforementioned fabric-wide deployment attempt had been a failure, then the process proceeds to Step 382 (see e.g., FIG. 3G).

In Step 332, after determining (in Step 330) that the attempted fabric-wide deployment (in Step 324) of the network device rule (generated in Step 318) had been a success, and based on both the ISQ and the IDQ (identified in Step 304) reflecting the LISTED state—i.e., (ISQ, IDQ)=(LISTED, LISTED)—another network device rule is generated using at least the destination group(s) (identified in Step 308). In one embodiment of the invention, the generated network device rule may pertain to the fail-close network device rule subclass (see e.g., FIG. 2C). Further, the generated network device rule may incorporate the identified destination group(s) as the RMC specified therein (see e.g., FIG. 2A).

In Step 334, a fabric-wide deployment of the network device rule (generated in Step 332) is attempted. The fabric-wide attempt at deploying the network device rule is described in further detail below with respect to FIG. 4. Hereinafter, the process proceeds to Step 340 (see e.g., FIG. 3D).

Figure 3D:
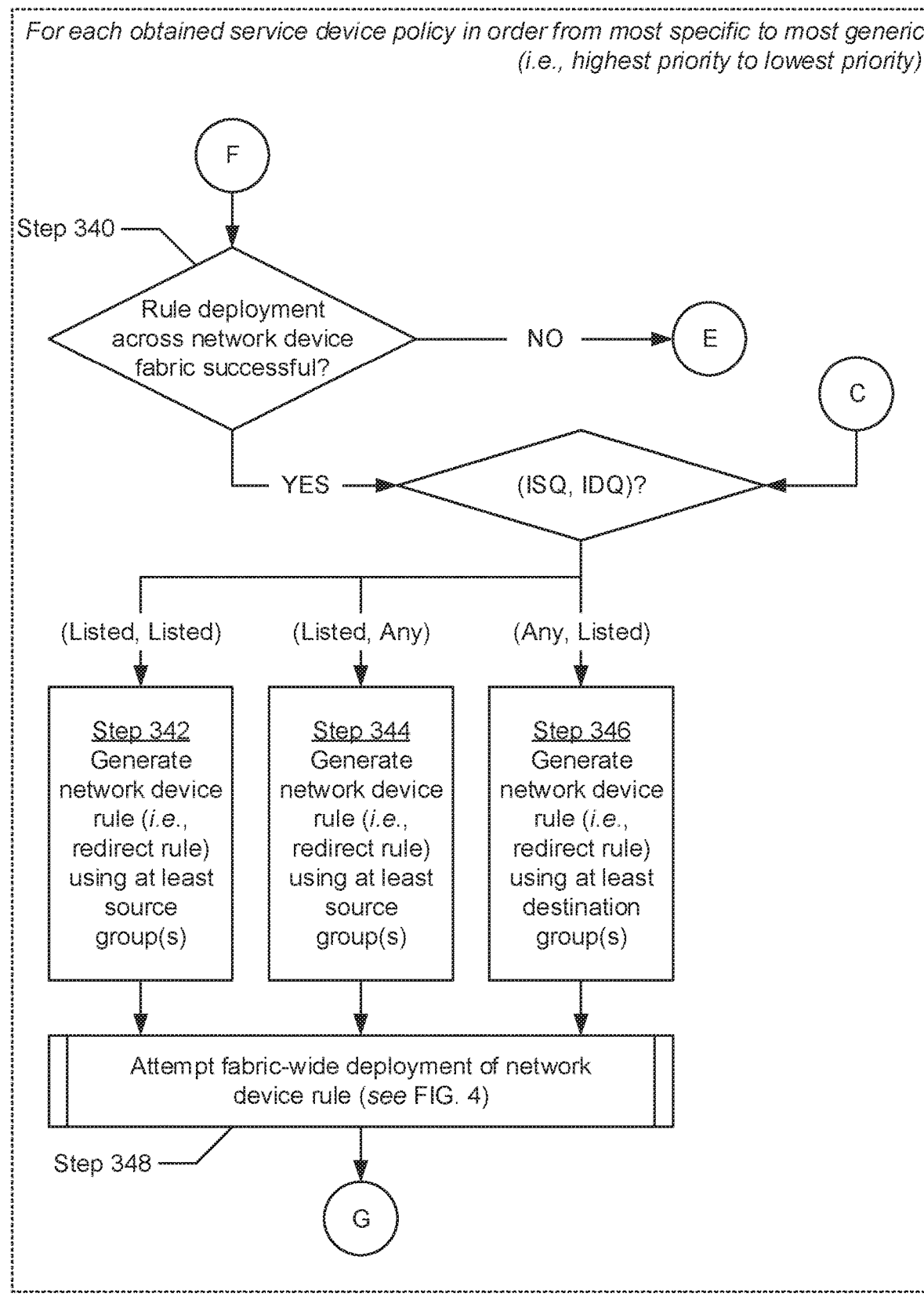

Turning to FIG. 3D, in Step 340, following the attempted fabric-wide deployment (in Step 334) of the network device rule (generated in Step 332), a determination is made as to whether the aforementioned fabric-wide deployment attempt had been successful. Success of the fabric-wide deployment attempt may be contingent on a commitment of the aforementioned network device rule on and by all network devices forming the network device fabric (described above). Alternatively, failure of the fabric-wide deployment attempt may reflect that at least one network device, of the network device fabric, was not able to commit the aforementioned network device rule. Accordingly, in one embodiment of the invention, if it is determined that the aforementioned fabric-wide deployment attempt had been a success, then the process proceeds to Step 342. On the other hand, in another embodiment of the invention, if it is alternatively determined that the aforementioned fabric-wide deployment attempt had been a failure, then the process proceeds to Step 382 (see e.g., FIG. 3G).

In Step 342, after determining (in Step 340) that the attempted fabric-wide deployment (in Step 334) of the network device rule (generated in Step 332) had been a success, and based on both the ISQ and the IDQ (identified in Step 304) reflecting the LISTED state—i.e., (ISQ, IDQ)=(LISTED, LISTED)—another network device rule is generated using at least the source group(s) (identified in Step 308). In one embodiment of the invention, the generated network device rule may pertain to the redirect network device rule subclass (see e.g., FIG. 2C). Further, the generated network device rule may incorporate the identified source group(s) as the RMC specified therein (see e.g., FIG. 2A).

In Step 344, after determining (in Step 330) that the attempted fabric-wide deployment (in Step 324) of the network device rule (generated in Step 320) had been a success, and based on the ISQ and the IDQ (identified in Step 304) reflecting the LISTED and ANY states, respectively—i.e., (ISQ, IDQ)=(LISTED, ANY)—another network device rule is generated using at least the source group(s) (identified in Step 310). In one embodiment of the invention, the generated network device rule may pertain to the redirect network device rule subclass (see e.g., FIG. 2C).

Further, the generated network device rule may incorporate the identified source group(s) as the RMC specified therein (see e.g., FIG. 2A).

In Step 346, after determining (in Step 330) that the attempted fabric-wide deployment (in Step 324) of the network device rule (generated in Step 322) had been a success, and based on the ISQ and the IDQ (identified in Step 304) reflecting the ANY and LISTED states, respectively—i.e., (ISQ, IDQ)=(ANY, LISTED)—another network device rule is generated using at least the destination group(s) (identified in Step 312). In one embodiment of the invention, the generated network device rule may pertain to the redirect network device rule subclass (see e.g., FIG. 2C). Further, the generated network device rule may incorporate the identified destination group(s) as the RMC specified therein (see e.g., FIG. 2A).

In Step 348, a fabric-wide deployment of the network device rule (generated in Step 342, Step 344, or Step 346) is attempted. The fabric-wide attempt at deploying the network device rule is described in further detail below with respect to FIG. 4. Hereinafter, the process proceeds to Step 354 (see e.g., FIG. 3E).

Figure 3E:
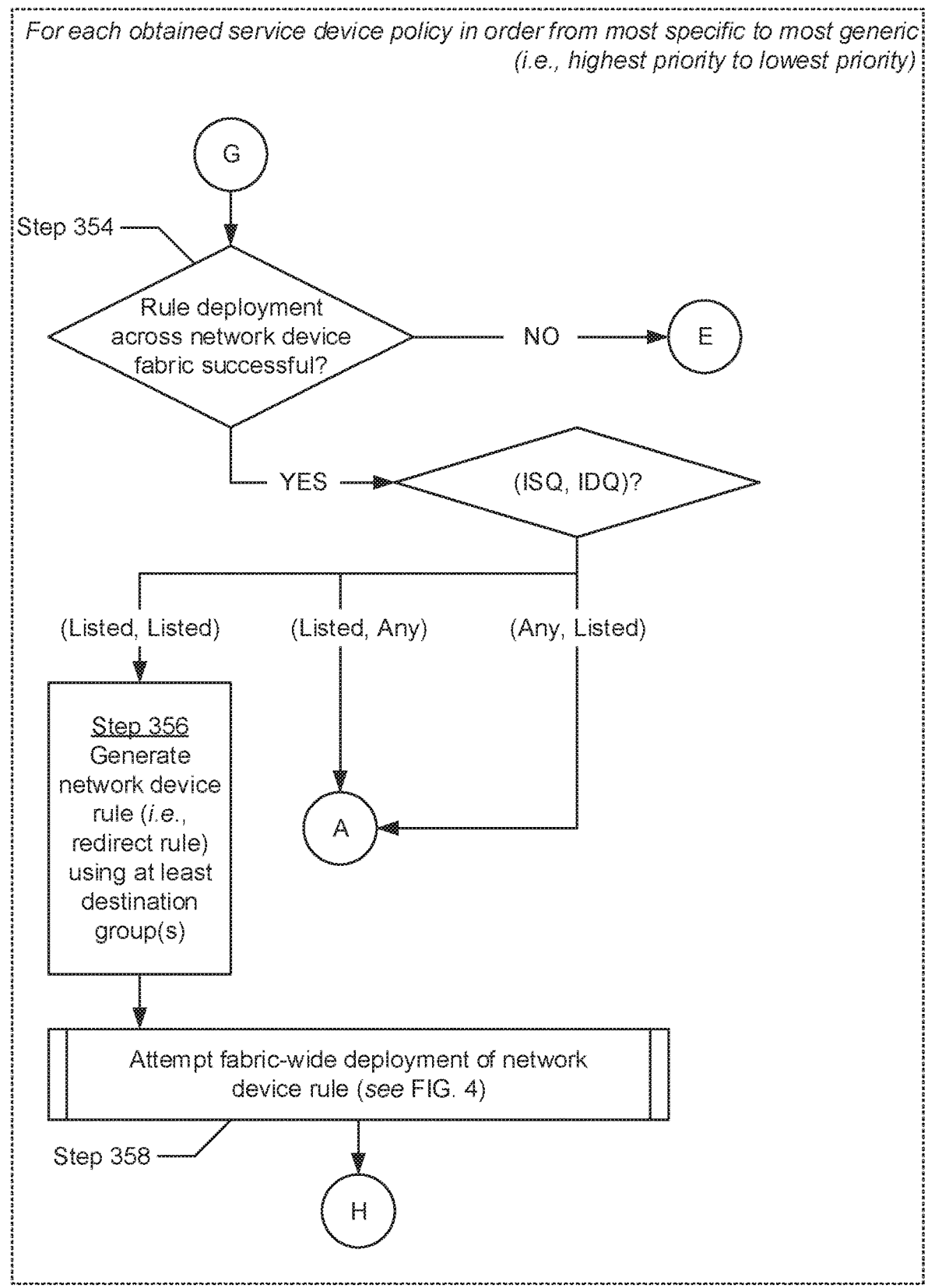

Turning to FIG. 3E, in Step 354, following the attempted fabric-wide deployment (in Step 348) of the network device rule (generated in Step 342, Step 344, or Step 346), a determination is made as to whether the aforementioned fabric-wide deployment attempt had been successful. Success of the fabric-wide deployment attempt may be contingent on a commitment of the aforementioned network device rule on and by all network devices forming the network device fabric (described above). Alternatively, failure of the fabric-wide deployment attempt may reflect that at least one network device, of the network device fabric, was not able to commit the aforementioned network device rule. Accordingly, in one embodiment of the invention, if it is determined that the aforementioned fabric-wide deployment attempt had been a success, then the process proceeds to Step 356, or Step 368 or Step 370 (see e.g., FIG. 3F) (depending on the reflected ISQ and IDQ states (determined in Step 306)). On the other hand, in another embodiment of the invention, if it is alternatively determined that the aforementioned fabric-wide deployment attempt had been a failure, then the process proceeds to Step 382 (see e.g., FIG. 3G).

In Step 356, after determining (in Step 354) that the attempted fabric-wide deployment (in Step 348) of the network device rule (generated in Step 342) had been a success, and based on both the ISQ and the IDQ (identified in Step 304) reflecting the LISTED state—i.e., (ISQ, IDQ)=(LISTED, LISTED)—another network device rule is generated using at least the destination group(s) (identified in Step 308). In one embodiment of the invention, the generated network device rule may pertain to the redirect network device rule subclass (see e.g., FIG. 2C). Further, the generated network device rule may incorporate the identified destination group(s) as the RMC specified therein (see e.g., FIG. 2A).

In Step 358, a fabric-wide deployment of the network device rule (generated in Step 356) is attempted. The fabric-wide attempt at deploying the network device rule is described in further detail below with respect to FIG. 4. Hereinafter, the process proceeds to Step 364 (see e.g., FIG. 3F).

Figure 3F:
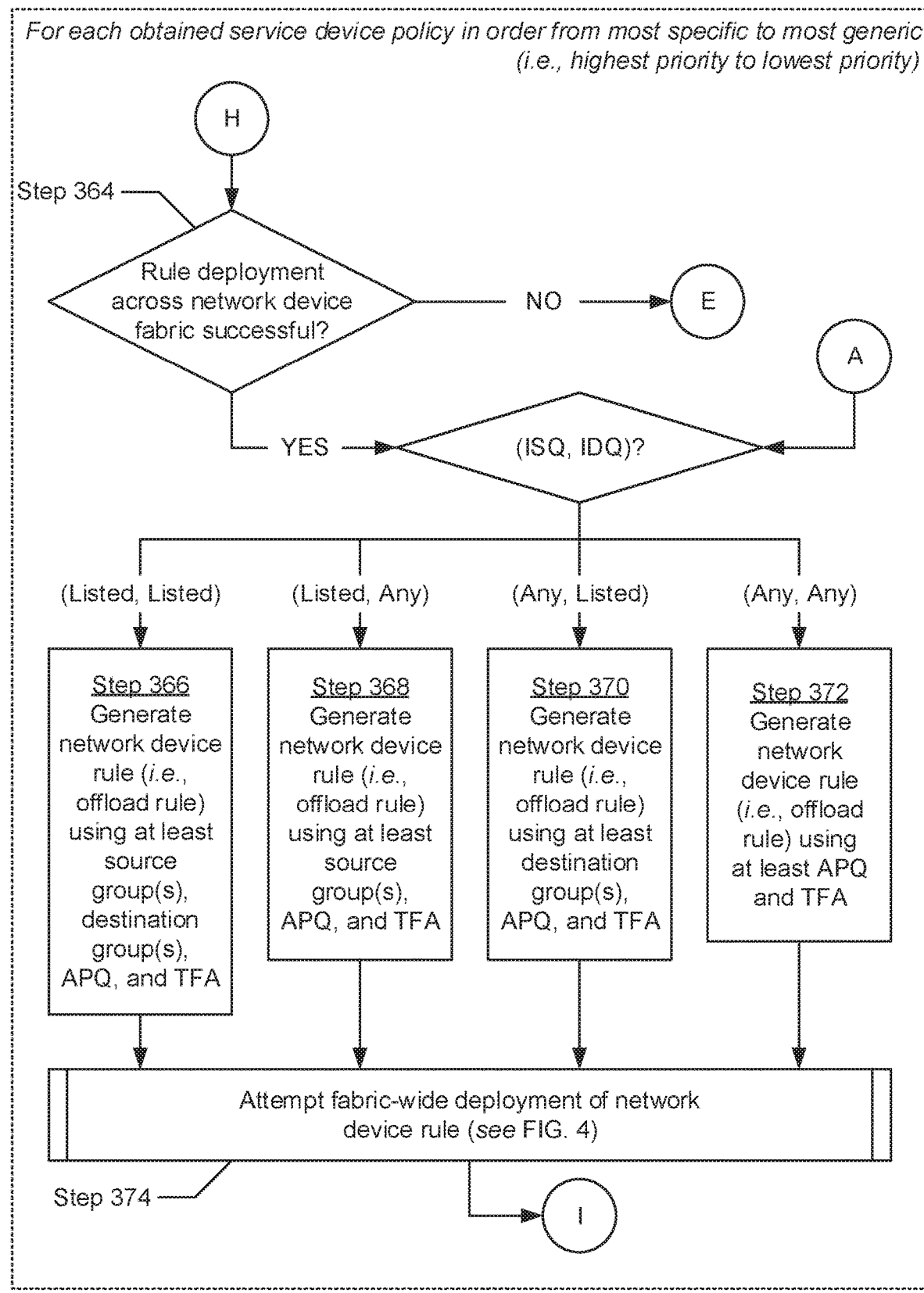

Turning to FIG. 3F, in Step 364, following the attempted fabric-wide deployment (in Step 358) of the network device rule (generated in Step 356), a determination is made as to whether the aforementioned fabric-wide deployment attempt had been successful. Success of the fabric-wide deployment attempt may be contingent on a commitment of the aforementioned network device rule on and by all network devices forming the network device fabric (described above). Alternatively, failure of the fabric-wide deployment attempt may reflect that at least one network device, of the network device fabric, was not able to commit the aforementioned network device rule. Accordingly, in one embodiment of the invention, if it is determined that the aforementioned fabric-wide deployment attempt had been a success, then the process proceeds to Step 366. On the other hand, in another embodiment of the invention, if it is alternatively determined that the aforementioned fabric-wide deployment attempt had been a failure, then the process proceeds to Step 382 (see e.g., FIG. 3G).

In Step 366, after determining (in Step 364) that the attempted fabric-wide deployment (in Step 358) of the network device rule (generated in Step 356) had been a success, and based on both the ISQ and the IDQ (identified in Step 304) reflecting the LISTED state—i.e., (ISQ, IDQ)=(LISTED, LISTED)—another network device rule is generated using at least the source and destination group(s) (identified in Step 308), as well as the APQ and TFA (identified in Step 304). In one embodiment of the invention, the generated network device rule may pertain to the offload network device rule subclass (see e.g., FIG. 2C). Further, the generated network device rule may incorporate the identified source group(s), destination group(s), and the APQ as the RMC specified therein, whereas the identified TFA may be incorporated as the TFA specified therein (see e.g., FIG. 2A).

In Step 368, after determining (in Step 354) that the attempted fabric-wide deployment (in Step 348) of the network device rule (generated in Step 344) had been a success, and based on the ISQ and the IDQ (identified in Step 304) reflecting the LISTED and ANY states, respectively—i.e., (ISQ, IDQ)=(LISTED, ANY)—another network device rule is generated using at least the source group(s) (identified in Step 310), as well as the APQ and TFA (identified in Step 304). In one embodiment of the invention, the generated network device rule may pertain to the offload network device rule subclass (see e.g., FIG. 2C). Further, the generated network device rule may incorporate the identified source group(s) and the APQ as the RMC specified therein, whereas the identified TFA may be incorporated as the TFA specified therein (see e.g., FIG. 2A).

In Step 370, after determining (in Step 354) that the attempted fabric-wide deployment (in Step 348) of the network device rule (generated in Step 346) had been a success, and based on the ISQ and the IDQ (identified in Step 304) reflecting the ANY and LISTED states, respectively—i.e., (ISQ, IDQ)=(ANY, LISTED)—another network device rule is generated using at least the destination group(s) (identified in Step 312), as well as the APQ and TFA (identified in Step 304). In one embodiment of the invention, the generated network device rule may pertain to the offload network device rule subclass (see e.g., FIG. 2C). Further, the generated network device rule may incorporate the identified destination group(s) and the APQ as the RMC specified therein, whereas the identified TFA may be incorporated as the TFA specified therein (see e.g., FIG. 2A).

In Step 372, after determining (in Step 306) that both the ISQ and the IDQ (identified in Step 304) reflect the ANY state—i.e., (ISQ, IDQ)=(ANY, ANY)—a network device rule is generated using at least the APQ and TFA (identified in Step 304). In one embodiment of the invention, the generated network device rule may pertain to the offload network device rule subclass (see e.g., FIG. 2C). Further, the generated network device rule may incorporate the identified APQ as the RMC specified therein, whereas the identified TFA may be incorporated as the TFA specified therein (see e.g., FIG. 2A).

In Step 374, a fabric-wide deployment of the network device rule (generated in Step 366, Step 368, Step 370, or Step 372) is attempted. The fabric-wide attempt at deploying the network device rule is described in further detail below with respect to FIG. 4. Hereinafter, the process proceeds to Step 380 (see e.g., FIG. 3G).

Figure 3G:
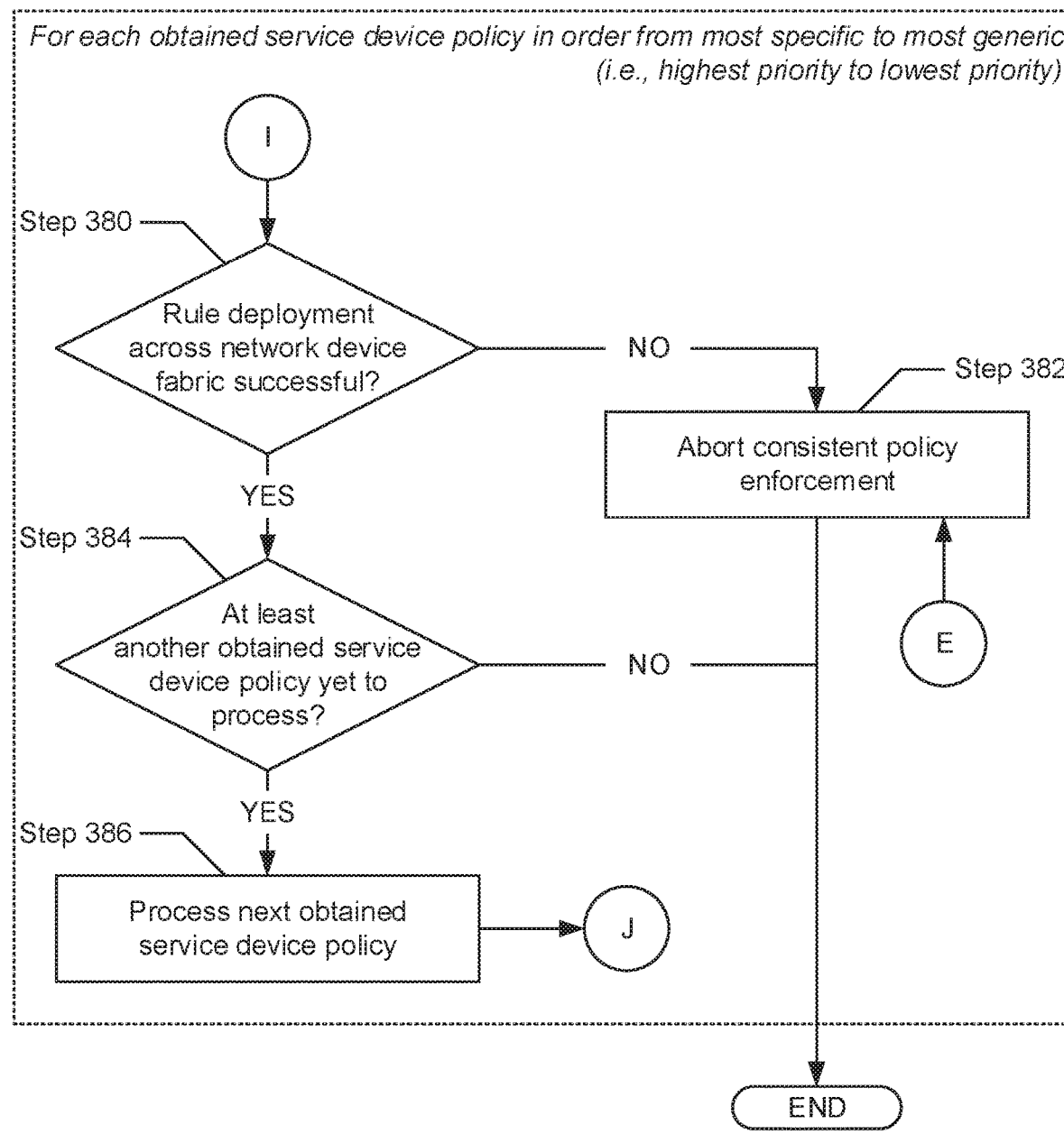

Turning to FIG. 3G, in Step 380, following the attempted fabric-wide deployment (in Step 374) of the network device rule (generated in Step 366, Step 368, Step 370, or Step 372), a determination is made as to whether the aforementioned fabric-wide deployment attempt had been successful. Success of the fabric-wide deployment attempt may be contingent on a commitment of the aforementioned network device rule on and by all network devices forming the network device fabric (described above). Alternatively, failure of the fabric-wide deployment attempt may reflect that at least one network device, of the network device fabric, was not able to commit the aforementioned network device rule. Accordingly, in one embodiment of the invention, if it is determined that the aforementioned fabric-wide deployment attempt had been a success, then the process proceeds to Step 384. On the other hand, in another embodiment of the invention, if it is alternatively determined that the aforementioned fabric-wide deployment attempt had been a failure, then the process alternatively proceeds to Step 382.

In Step 382, after determining (in Step 330, Step 340, Step 354, Step 364, or Step 380) that the attempted fabric-wide deployment (in Step 324, Step 334, Step 348, Step 358, or Step 374) of the network device rule (generated in Step 318, Step 320, Step 322, Step 332, Step 342, Step 344, Step 346, Step 356, Step 366, Step 368, Step 370, or Step 372) had been a failure, consistent policy enforcement is aborted. In one embodiment of the invention, consistent policy enforcement may refer to offloading enforcement of a given service device policy onto the network device fabric. As described thus far, offloading enforcement of a given service device policy may entail the generation of one or more network device rules, derived from the given service device policy, which subsequently require fabric-wide deployment. Fabric wide-deployment may be contingent on the commitment of any given network device rule on/by each and every network device that forms the network device fabric. Accordingly, consistent policy enforcement may be contingent on the commitment of each and every generated network device rule, derived from a given service device policy, on/by each and every network device that forms the network device fabric. Should any generated network device rule, derived from a given service device policy, not be committed (or accommodated) on/by at least one network device forming the network device fabric, fabric-wide maintenance and enforcement of the given service device policy, and thus consistent policy enforcement, cannot be achieved.

In Step 384, after determining (in Step 380) that the attempted fabric-wide deployment (in Step 374) of the network device rule (generated in Step 366, Step 368, Step 370, or Step 372) had been a success, another determination is made as to whether at least another service device policy (of the service device policy set obtained in Step 300) still remains to be processed. Accordingly, in one embodiment of the invention, if it is determined that at least one other service device policy remains to be processed, then the process proceeds to Step 386. On the other hand, in another embodiment of the invention, if it is alternatively determined that zero service device policies remain to be processed, then the process alternatively ends.

In Step 386, after determining (in Step 384) that at least one other service device policy (of the service device policy set obtained in Step 300) remains to be processed, a next obtained service device policy is processed. Specifically, in one embodiment of the invention, the next obtained service device policy may refer to an obtained service device policy associated with a next highest processing priority based on a specificity (described above) of the obtained service device policy. Hereinafter, the process proceeds to Step 304 (see e.g., FIG. 3A).

While FIGS. 3A-3G outline a methodology for offloading service device policies, other methodologies may be used without departing from the scope of the invention. For example, the above-described methodology incorporates sequential network device rule processing. That is, for each network device rule that is generated, a separate fabric-wide deployment transaction is attempted. However, in another embodiment of the invention, another methodology may be employed which alternatively incorporates batch network device rule processing. Through batch network device rule processing, all necessary network device rules (i.e., a network device rule batch) may be generated first, followed by the attempt of a single fabric-wide deployment transaction to disseminate the network device rule batch.

Figure 4:
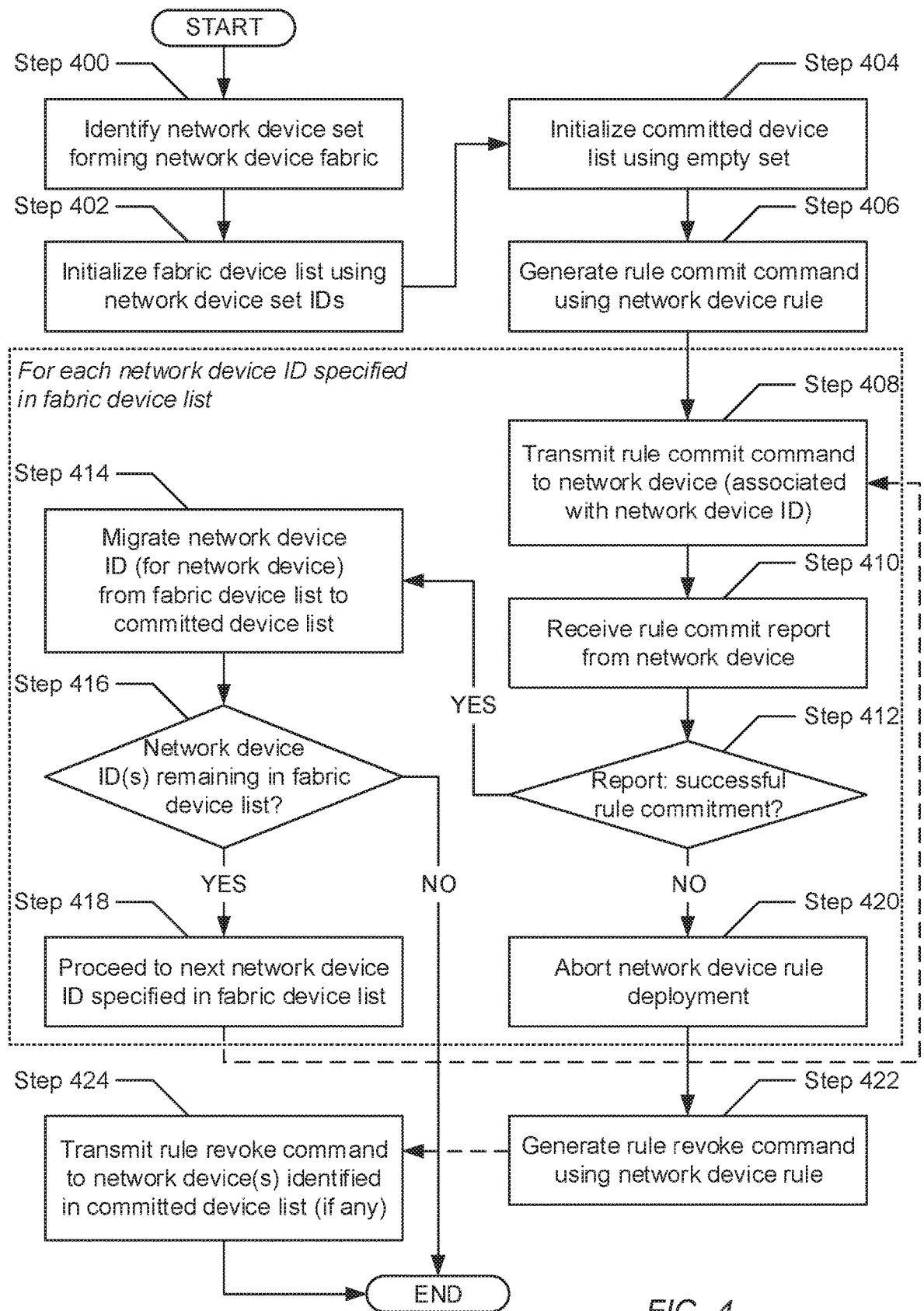
FIG. 4 shows a flowchart describing a method for consistently enforcing network device rules in accordance with one or more embodiments of the invention.

FIG. 4 shows a flowchart describing a method for consistently enforcing network device rules in accordance with one or more embodiments of the invention. The various steps outlined below may be performed by the control plane service (CPS) (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 4, in Step 400, a network device set—forming a network device fabric—is identified. In one embodiment of the invention, the network device fabric may refer to the collection of interconnected network devices (see e.g., FIG. 1) that form a network.

In Step 402, a fabric device list is initialized. In one embodiment of the invention, the fabric device list may represent an abstract data type, a data object, or a data structure capable of retaining zero or more data values. Each data value, if any, may take form as a network device identifier (ID) associated with a network device of the network device set (identified in Step 400). A network device ID may refer to an arbitrary-length character string, expressed through any combination of letters, numbers, symbols, etc., which serve to uniquely identify a respective network device. Specifically, the fabric device list may reflect which network device(s), of the network device fabric, remain to commit a network device rule attempting to be consistently enforced. Furthermore, initialization of the fabric device list may entail populating the fabric device list to include a network device ID for each network device forming the network device fabric.

In Step 404, a committed device list is initialized. In one embodiment of the invention, the committed device list may represent an abstract data type, a data object, or a data structure capable of retaining zero or more data values. Each data value, if any, may take form as a network device ID associated with a network device of the network device set (identified in Step 400). A network device ID may refer to an arbitrary-length character string, expressed through any combination of letters, numbers, symbols, etc., which serve to uniquely identify a respective network device. Specifically, the committed device list may reflect which network device(s), of the network device fabric, have thus far committed a network device rule attempting to be consistently enforced. Furthermore, initialization of the committed device list may entail populating the committed device list with zero data values—effectively initializing the committed device list as an empty set.

In Step 406, a rule commit command is generated using a network device rule. In one embodiment of the invention, the network device rule may refer to any network device rule generated while offloading one or more service device policies described in further detail above with respect to FIGS. 3A-3G. Further, the rule commit command may represent instructions directed to a network device, which may instruct the network device to attempt a commitment of the network device rule (see e.g., FIG. 5). Accordingly, the rule commit command may include or specify the network device rule.

Hereinafter, a subset of the remaining steps (i.e., Steps 408 through 420) outlined below may be performed for each network device ID (specified in the fabric device list initialized in Step 402 or updated in Step 414 (described below)).

In Step 408, the rule commit command (generated in Step 406) is transmitted. Specifically, in one embodiment of the invention, the rule commit command is transmitted to the network device identified by the network device ID (currently being processed from the fabric device list). Following the aforementioned transmission, in Step 410, a corresponding rule commit report is received from the network device. In one embodiment of the invention, the rule commit report may represent feedback from the network device regarding the attempt at committing the above-mentioned network device rule to which the rule commit command had referred. The rule commit report may indicate one of two possible outcomes—e.g., (a) the attempted commitment of the network device rule resulted in success; or (b) the attempted commitment of the network device rule resulted in failure.

In Step 412, a determination is made as to whether the rule commit report (received in Step 410) reflected that the attempted commitment of the network device rule resulted in success. Accordingly, in one embodiment of the invention, if it is determined that the rule commit report indicates the success of the attempted commitment of the network device rule, then the process proceeds to Step 414. On the other hand, in another embodiment of the invention, if it is alternatively determined that the rule commit report indicates the failure of the attempted commitment of the network device rule, then the process alternatively proceeds to Step 420.

In Step 414, after determining (in Step 412) that the attempted commitment of the network device rule, by the network device, resulted in success, the fabric device and committed device lists are updated. Specifically, in one embodiment of the invention, the network device ID (currently being processed from the fabric device list) may migrate from the fabric device list to the committed device list. That is, the aforementioned network device ID may be removed from the fabric device list and, subsequently, deposited or added to the committed device list. Further, the migration of the network device ID between lists may reflect that the network device, identified by the network device ID, represents one less network device required to consistently enforce the network device rule.

In Step 416, a determination is made as to whether at least another network device ID (from the fabric device list initialized in Step 402 or updated in Step 414) still remains to be processed. Accordingly, in one embodiment of the invention, if it is determined that at least one other network device ID remains to be processed, then the process proceeds to Step 418. On the other hand, in another embodiment of the invention, if it is alternatively determined that zero network device IDs remain to be processed—indicative that the fabric device list is empty—then the process alternatively ends, and consistent fabric-wide enforcement of the network device rule is achieved.

In Step 418, after determining (in Step 416) that at least one other network device ID (from the fabric device list initialized in Step 402 or updated in Step 414) remains to be processed, a next network device ID, retained in the fabric device list, is processed. Subsequently, in one embodiment of the invention, the process proceeds to Step 408, where the rule commit command (generated in Step 406) is transmitted to the next network device ID associated with another network device forming the network device fabric.

In Step 420, after alternatively determining (in Step 412) that the attempted commitment of the network device rule, by the network device, resulted in failure, the fabric-wide deployment of the network device rule (as well as any subsequently generated network device rules (see e.g., FIGS. 3A-3G)) is aborted. In effect, in one embodiment of the invention, the attempt to consistently enforce a respective service device policy—from which at least the network device rule is derived—using the network device fabric in place of a service device, is terminated.

In Step 422, following the termination of the consistent enforcement attempt, a rule revoke command is generated using the network device rule. In one embodiment of the invention, the rule revoke command may represent instructions directed to a network device, which may instruct the network device to retract an earlier commitment of the network device rule. Accordingly, the rule revoke command may include or specify the network device rule.

In Step 424, the rule revoke command (generated in Step 422) is subsequently transmitted to one or more network devices, if any, identified by one or more network device IDs, respectively, retained in the committed device list (initialized in Step 404 or updated in Step 414). That is, in one embodiment of the invention, the rule revoke command may be issued to each network device that may have reported the successful commitment of the network device rule.

In one embodiment of the invention, upon receipt of the rule revoke command, a given network device may respond by, for example, performing the following steps: (a) extracting the network device rule from the received rule revoke command; (b) identifying a rule identifier (RID) (see e.g., FIG. 2A) associated with and specified in the network device rule; (c) performing a lookup on a lookup table—e.g., ternary content addressable memory (TCAM)—using the identified RID, to identify a lookup table entry representative of the earlier committed network device rule; and (d) removing or deleting the identified lookup table entry from the lookup table.

FIG. 5 shows a flowchart describing a method for committing network device rules in accordance with one or more embodiments of the invention. The various steps outlined below may be performed by each network device (see e.g., FIG. 1) in a network device fabric. Further, while the various steps in the flowcharts are presented and described sequentially, one of ordinary skill will appreciate that some or all steps may be executed in different orders, may be combined or omitted, and some or all steps may be executed in parallel.

Turning to FIG. 5, in Step 500, a rule commit command is received from the control plane service (CPS) (see e.g., FIG. 1). In one embodiment of the invention, the rule commit command may represent instructions directed to the network device, which may instruct the network device to attempt a commitment of a network device rule. Accordingly, the rule commit command may include or specify the aforementioned network device rule. Further, the network device rule may refer to any network device rule generated while offloading one or more service device policies described in further detail above with respect to FIGS. 3A-3G.

In Step 502, the network device rule (obtained by receiving the rule commit command in Step 500) is compared against a set of existing table entries in a lookup table. In one embodiment of the invention, the lookup table may represent a data structure maintained on the network device, which may store and track various traffic management and/or access rules, followed by the network device, for processing certain network traffic flows. Further, each existing table entry of the set of existing table entries may pertain to a rule-defined network traffic flow, which the network device processes by applying a rule-specified traffic flow action (TFA) to matching network traffic flows. By way of an example, the lookup table may be implemented using ternary content addressable memory (TCAM).

In Step 504, based on the comparison (performed in Step 502), a determination is made as to whether the network device rule (obtained in Step 500) matches an existing table entry in the lookup table. Matching of the network device rule to an existing table entry may reflect that each and every subcomponent—e.g., rule identifier (RID), rule priority level (RPL), rule match criteria (RMC), and traffic flow action (TFA) (see e.g., FIG. 2A)—of the network device rule is specified in the identified existing table entry. Accordingly, in one embodiment of the invention, if it is determined that the network device rule matches an existing table entry in the lookup table, then the process proceeds to Step 514. On the other hand, if it is alternatively determined that the network device rule does not match any of the existing table entries in the lookup table, then the process alternatively proceeds to Step 506.

In Step 506, after determining (in Step 504) that the network device rule (obtained in Step 500) does not match any existing table entry in the lookup table based on the comparison (performed in Step 502), a lookup table status is obtained. In one embodiment of the invention, the lookup table status may represent a state variable that maintains a data value indicative of a current state of the lookup table. By way of examples, the data value may reflect any subset or all of the following possible states—e.g., (a) a FULL state, indicative that all table entries allocated to the lookup table is occupied and, thus, the lookup table is full; (b) an EMPTY state, indicative that all table entries allocated to the lookup table are unoccupied and, thus, the lookup table is empty; and/or (c) an AVAILABLE state, indicative that at least one table entry allocated to the lookup table is unoccupied.

In Step 508, a determination is made as to whether the lookup table status (obtained in Step 506) reflects that the lookup table is full—i.e., whether the lookup table status=the FULL state. Accordingly, in one embodiment of the invention, if it is determined that the lookup table is full, then the process proceeds to Step 510. On the other hand, in another embodiment of the invention, if it is alternatively determined that the lookup table is not full—e.g., either empty or exhibits at least one unoccupied, allocated table entry—then the process alternatively proceeds to Step 512.

In Step 510, after determining (in Step 508) that the lookup table status (obtained in Step 506) reflects that the lookup table is full, a rule commit report is generated. Specifically, in one embodiment of the invention, the rule commit report may represent feedback from the network device regarding the attempt at committing the network device rule (obtained in Step 500). Further, the rule commit report may indicate that the attempted commitment of the network device rule resulted in failure. Failure may have resulted because all table entries allocated to the lookup table had been determined to be occupied and, accordingly, the obtained network device rule could not be accommodated therein.

In Step 512, after alternatively determining (in Step 510) that the lookup table status (obtained in Step 506) reflects that the lookup table is not full, the lookup table is updated. Specifically, in one embodiment of the invention, the lookup table may be updated to include or accommodate the network device rule (obtained in Step 500) therein.

In Step 514, following the update to the lookup table (in Step 512) or after determining (in Step 504) that the network device rule (obtained in Step 500) matches an existing table entry in the lookup table based on the comparison (performed in Step 502), a rule commit report is generated. In one embodiment of the invention, the rule commit report may represent feedback from the network device regarding the attempt at committing the network device rule (obtained in Step 500). Further, the rule commit report may indicate that the attempted commitment of the network device rule resulted in success. Success may have resulted because: (a) at least one table entry allocated to the lookup table had been determined to be unoccupied and, accordingly, the obtained network device rule could be accommodated therein; or (b) the obtained network device rule already exists in the lookup table.

In Step 516, following the generation of the appropriate rule commit report (in Step 510 or Step 514), the rule commit report is subsequently transmitted to the CPS.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a network device fabric, comprising a plurality of network devices, the method comprising:
   obtaining, from a service device, a first service device policy set;
   obtaining a service device unreachability semantic, which represents a fallback protocol to follow should the service device become unreachable after at least one network device rule corresponding to the first service device policy set is deployed;
   examining the first service device policy set to identify a first set of qualifiers and a first traffic flow action for each policy in the first service device policy set, wherein service device policies in the first set of service device policies are ordered from most specific to least specific;
   selecting a most specific service device policy of the service device policies that has not been processed to obtain a selected service device policy;

processing the selected service device policy, comprising:
   deriving, from the selected service device policy, a network device rule from the corresponding first set of qualifiers and the first traffic flow action for the selected service device policy, wherein deriving the network device rule comprises:
      identifying a source group and a destination group using the corresponding first set of qualifiers for the selected service device policy, and
      deriving the network device rule using the source group, the destination group, and the unreachability semantic;
   deploying the network device rule, wherein the deploying comprises:
      transmitting a command to each of the network devices of the network device fabric to deploy the network device rule;
      determining whether each of the network devices confirms deployment of the network device rule;
      revoking, based on the determining, deployment of the network device rule at each of the network devices if any of the network devices reports failure to deploy the network device rule; and
   in response to the revoking, not processing any more of the service device polices in the first set of service device policies that have not been processed,
   wherein the network device rule is directed to an offload network device rule subclass, a fail-close network device rule subclass, or a redirect network device rule subclass.

2. The method of claim 1, wherein the first set of qualifiers comprises an application-protocol qualifier (APQ), an intercept source qualifier (ISQ) reflecting an ANY state and an intercept destination qualifier (IDQ) reflecting the ANY state.

3. The method of claim 1, wherein deploying the network device rule further comprises:
   identifying a network device set that forms the network device fabric.

4. The method of claim 1, wherein determining whether the network device confirms deployment of the network device rule comprises:
   receiving a rule commit report from the network device.

5. The method of claim 1, further comprising:
   obtaining, from the service device, a second service device policy set;
   examining the second service device policy set to identify a second set of qualifiers and a second traffic flow action for each policy in the second service device policy set;
   deriving, from each policy in the second service device policy set, a corresponding second network device rule from the corresponding second set of qualifiers and the second traffic flow action;
   deploying the policies in the second service device policy set in an order from most specific to least specific.

6. The method of claim 5, wherein the deploying of the policies in the second service device policy set comprises:
   transmitting a command to each of the network devices of the network device fabric to deploy the corresponding second network device rule;
   determining whether each of the network devices confirms deployment of the corresponding second network device rule; and
   revoking deployment of the corresponding second network device rule at each of the network devices if any of the network devices reports failure to deploy the corresponding second network device rule,
   wherein once deployment of the policy in the second service device policy set has been revoked, remaining undeployed policies in the second service device policy set that are less specific than a revoked policy are not deployed.

7. The method of claim 1, further comprising:
   prior to deriving the network device rule:
      obtaining, from the service device, a second service device policy set;
      establishing a processing prioritization based on a first specificity of the first service device policy set and a second specificity of the second service device policy set; and
      based on the processing prioritization:
         offloading enforcement of the second service device policy set.

8. The method of claim 7, wherein establishing the processing prioritization based on the first and second specificities, comprises:
   examining the second service device policy set to identify at least a second set of qualifiers;
   measuring the first specificity based at least on a first cardinality of the first set of qualifiers;
   measuring the second specificity based at least on a second cardinality of the second set of qualifiers;
   making a determination, based on the second specificity exceeding the first specificity, that the second service device policy is more specific than the first service device policy; and
   establishing the processing prioritization based on the determination.

9. The method of claim 1, further comprising:
   obtaining, from the service device, a second service device policy set;
   examining the second service device policy set to identify a second set of qualifiers and a second traffic flow action;
   performing a lookup on a group assignment table using the second set of qualifiers, to identify a set of groups;
   deriving, from the second service device policy set, a second network device rule comprising the set of groups; and
   deploying policies in the second service device policy set in an order from most specific to least specific.

10. The method of claim 9, wherein the second set of qualifiers comprises an intercept source qualifier (ISQ) reflecting a LISTED state and an intercept destination qualifier (IDQ) reflecting an ANY state, wherein the set of groups comprises at least one source group.

11. The method of claim 9, wherein the second set of qualifiers comprises an intercept source qualifier (IS Q) reflecting an ANY state and an intercept destination qualifier (IDQ) reflecting a LISTED state, wherein the set of groups comprises at least one destination group.

12. The method of claim 9, wherein the second set of qualifiers comprises an intercept source qualifier (ISQ) reflecting a LISTED state and an intercept destination qualifier (IDQ) reflecting the LISTED state, wherein the set of groups comprises at least one source group and at least one destination group.

13. The method of claim 9, further comprising:
   making a determination that the deployment of the policies in the second service device policy set had succeeded; and deriving, from the second service device policy set and based on the determination, a third network device rule comprising the set of groups and the second traffic flow action.

14. The method of claim 1, wherein the network device rule is directed to a compressed list of metadata descriptive of or pertinent to one or more types of network traffic flows.

15. A system, comprising:
a network device fabric comprising a plurality of interconnected network devices;
a service device directly-connected to a network device of a plurality of network devices of the network device fabric; and
a control plane service (CPS) operatively connected to the network device fabric, and programmed to:
 obtain, from a service device, a service device policy set;
 obtain a service device unreachability semantic, which represents a fallback protocol to follow should the service device become unreachable after at least one network device rule corresponding to the service device policy set is deployed;
 examine the service device policy set to identify a set of qualifiers and a traffic flow action for each policy in a service device policy set, wherein service device policies in the first set of service device policies are ordered from most specific to least specific;
 select a most specific service device policy of the service device policies that has not been processed to obtain a selected service device policy;
 process the selected service device policy, comprising:
  derive, from the selected service device policy, a network device rule from the corresponding set of qualifiers and the traffic flow action for the selected service device policy, wherein deriving the network device rule comprises:
   identifying a source group and a destination group using the corresponding first set of qualifiers for the selected service device policy, and
   deriving the network device rule using the source group, the destination group, and the unreachability semantic;
  deploy the network device rule, wherein the deploying comprises:
   transmitting a command to each of the network devices of the network device fabric to deploy the network device rule;
   determining whether each of the network devices confirms deployment of the network device rule;
   revoking, based on the determining, deployment of the network device rule at each of the network devices if any of the network devices reports failure to deploy the network device rule; and
   in response to the revoking, not processing any more of the service device polices in the set of service device policies that have not been processed,
  wherein the network device rule is directed to an offload network device rule subclass, a fail-close network device rule subclass, or a redirect network device rule subclass.

16. A non-transitory computer readable medium (CRM) comprising computer readable program code, which when executed by a computer processor, enables the computer processor to:
 obtain, from a service device, a service device policy set;
 obtain a service device unreachability semantic, which represents a fallback protocol to follow should the service device become unreachable after at least one network device rule corresponding to the service device policy set is deployed;
 examine the service device policy set to identify a set of qualifiers and a traffic flow action for each policy in a service device policy set, wherein service device policies in the first set of service device policies are ordered from most specific to least specific;
 select a most specific service device policy of the service device policies that has not been processed to obtain a selected service device policy;
 process the selected service device policy, comprising:
  derive, from the selected service device policy, a network device rule from the corresponding set of qualifiers and the traffic flow action for the selected service device policy, wherein deriving the network device rule comprises:
   identifying a source group and a destination group using the corresponding first set of qualifiers for the selected service device policy, and
   deriving the network device rule using the source group, the destination group, and the unreachability semantic;
  deploy the network device rule, wherein the deploying comprises:
   transmitting a command to each of the network devices of the network device fabric to deploy the network device rule;
   determining whether each of the network devices confirms deployment of the network device rule;
   revoking, based on the determining, deployment of the network device rule at each of the network devices if any of the network devices reports failure to deploy the network device rule; and
   in response to the revoking, not processing any more of the service device polices in the set of service device policies that have not been processed,
  wherein the network device rule is directed to an offload network device rule subclass, a fail-close network device rule subclass, or a redirect network device rule subclass.

* * * * *